United States Patent
Ashida et al.

(10) Patent No.: US 7,335,459 B2
(45) Date of Patent: *Feb. 26, 2008

(54) PHASE-CHANGE OPTICAL RECORDING MEDIUM

(75) Inventors: Sumio Ashida, Tokyo (JP); Takayuki Tsukamoto, Kawasaki (JP); Keiichiro Yusu, Yokohama (JP); Katsutaro Ichihara, Yokohama (JP); Noritake Ohmachi, Yokohama (JP); Naomasa Nakamura, Yokohama (JP); Nobuhisa Yoshida, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 424 days.

This patent is subject to a terminal disclaimer.

(21) Appl. No.: 10/717,963

(22) Filed: Nov. 21, 2003

(65) Prior Publication Data

US 2004/0121261 A1    Jun. 24, 2004

(30) Foreign Application Priority Data

Nov. 22, 2002 (JP) ............................. 2002-339437
Nov. 26, 2002 (JP) ............................. 2002-342896

(51) Int. Cl.
*G11B 7/24* (2006.01)

(52) U.S. Cl. .................. 430/270.13; 428/64.5; 428/64.4; 428/64.6; 369/275.2; 369/275.5; 369/283

(58) Field of Classification Search ...................... None
See application file for complete search history.

(56) References Cited

U.S. PATENT DOCUMENTS 5,768,221 A * 6/1998 Kasami et al. ................ 369/14
6,881,466 B2 * 4/2005 Kojima et al. ............. 428/64.1
7,008,681 B2 * 3/2006 Kitaura et al. ............. 428/64.1
7,214,416 B2 * 5/2007 Nakai et al. ............... 428/64.4
2002/0114915 A1 * 8/2002 Ohno et al. ................ 428/64.4
2002/0168495 A1 * 11/2002 Inase et al. ................ 428/64.4
2003/0180473 A1 * 9/2003 Nishihara et al. ........... 427/457
2004/0001418 A1 * 1/2004 Shinotsuka et al. ......... 369/111
2004/0017768 A1 * 1/2004 Hibino et al. ............... 369/283
2004/0023069 A1 * 2/2004 Kojima et al. ........... 428/694 T
2004/0076908 A1 * 4/2004 Oomachi et al. ...... 430/270.13

(Continued)

FOREIGN PATENT DOCUMENTS

JP        03-125343 A        5/1991

(Continued)

OTHER PUBLICATIONS

Japanese Office Action dated Mar. 29, 2005 for Appln. No. 2002-339437.

(Continued)

*Primary Examiner*—Martin Angebranndt
(74) *Attorney, Agent, or Firm*—Pillsbury Winthrop Shaw Pittman, LLP

(57) ABSTRACT

A phase-change optical recording medium includes a phase-change optical recording film that permits reversible phase change between a crystalline phase and an amorphous phase upon irradiation with light, and an interface film formed of hafnium oxide, or a mixture of hafnium oxide and at least one oxide selected from the group consisting of cerium oxide, titanium oxide and zirconium oxide, and formed in contact with at least one surface of the phase-change optical recording film.

18 Claims, 7 Drawing Sheets

U.S. PATENT DOCUMENTS

2005/0106353 A1* 5/2005 Nakai et al. ............... 428/64.4
2006/0146687 A1* 7/2006 Nakai et al. ............. 369/275.2

FOREIGN PATENT DOCUMENTS

| JP | 10-116441 A | 5/1998 |
|---|---|---|
| JP | 11-213446 | 8/1999 |
| JP | 11-339314 A | 12/1999 |
| JP | 2000-222777 | 8/2000 |
| JP | 2000-322770 | 11/2000 |
| JP | 2000-339760 A | 12/2000 |
| JP | 2001-014723 A | 1/2001 |
| JP | 2001-126308 A | 5/2001 |
| JP | 2001-167475 A | 6/2001 |
| JP | 2001-232941 | 8/2001 |
| JP | 2002-279693 | 9/2002 |
| JP | 2002-298433 A | 10/2002 |
| JP | 2003-67974 | 3/2003 |
| JP | 2003-233931 | 8/2003 |

OTHER PUBLICATIONS

Japanese Office Action dated Mar. 29, 2005 for Appln. No. 2002-342896.

T. Inase et al., "Investigation of Protective Layer for High Transfer Rate Phase Change Optical Disk," Tokyo Research Lab., Tosoh Corp., pp. 37-42, (Dec. 2001).

Mayumi Uno et al., "Acceleration of crystallization process by nitride interface layer," Optical Disk Systems Development Center, Matsushita Electric Industrial Co., Ltd., pp. 85-90, (Nov. 1992).

Rie Kojima et al., "Ge—Sn—Sb—Te Phase-change Recording Material Having High Crystallization Speed," Optical Disk Systems Development Center, Matsushita Electric Industrial Co., Ltd., pp. 36-41, (Nov.-Dec. 2000).

Michiaki Shinotsuka et al., "High-speed Blue-laser Recording on the Double-decker Phase Change Disk with High-Reliability," Research and Development Group, Ricoh Company, Ltd., IEEE 2002, pp. 234-236, (2002).

* cited by examiner

↑ Light

← Track direction →

← Track direction →

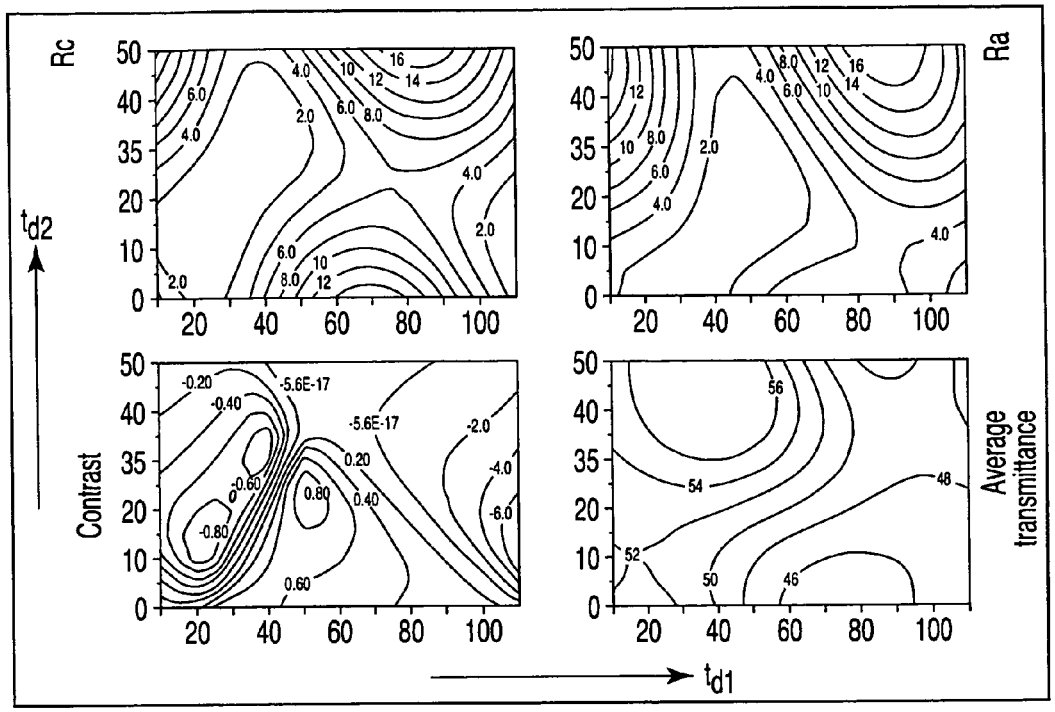
F I G. 12A
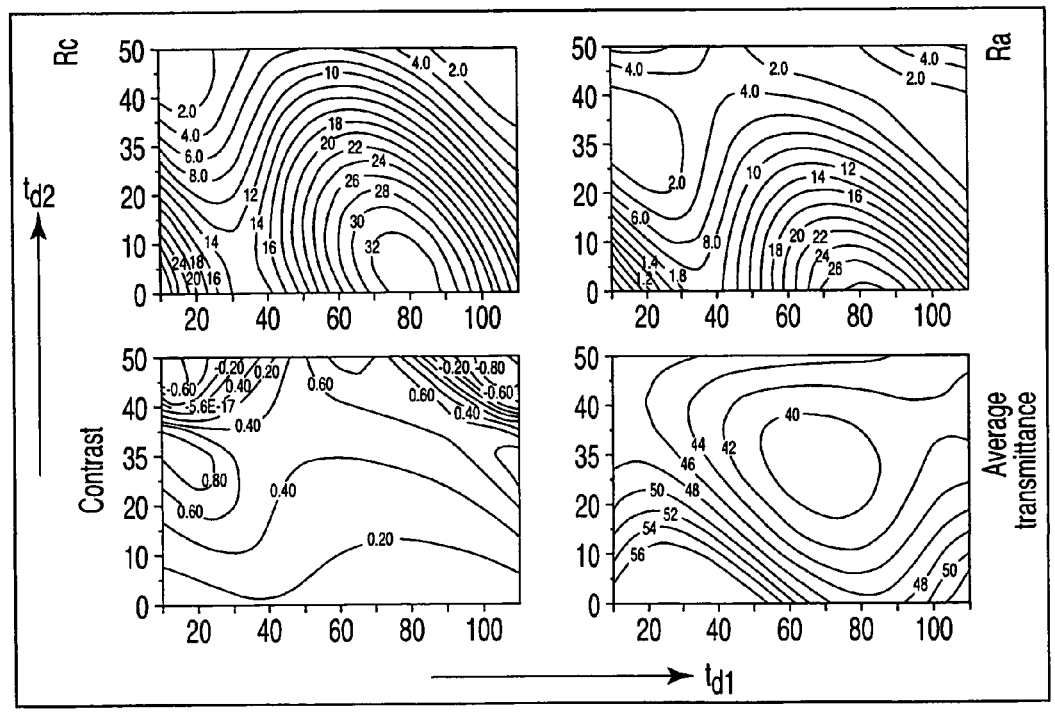
F I G. 12B

PHASE-CHANGE OPTICAL RECORDING MEDIUM

CROSS-REFERENCE TO RELATED APPLICATIONS

This application is based upon and claims the benefit of priority from the prior Japanese Patent Applications No. 2002-339437, filed Nov. 22, 2002; and No. 2002-342896, filed Nov. 26, 2002, the entire contents of both of which are incorporated herein by reference.

BACKGROUND OF THE INVENTION

1. Field of the Invention

The present invention relates to a phase-change optical recording medium in which phase change between a crystalline phase and an amorphous phase is reversibly caused by irradiation with a light beam so as to record information.

2. Description of the Related Art (Principle of Phase-Change Optical Recording Medium)

The phase-change optical recording medium, comprising a phase-change optical recording film that permits reversible phase change between a crystalline phase and an amorphous phase upon irradiation with a light beam, is operated by the principle described in the following. In a write stage, a region irradiated with a light beam is heated to a temperature higher than the melting point thereof so as to be melted, followed by rapidly cooling the region to change the arrangement of the atoms in the region into an amorphous phase. In the erasing stage, a temperature in a region irradiated with a light beam is maintained for at least a prescribed period of time to fall within a temperature range from the crystallization temperature to the melting point. Then, where the initial state is crystalline, the crystalline phase is left unchanged. On the other hand, where the initial state is amorphous, the amorphous phase is crystallized. In a reading stage, utilizing the fact that the intensity of reflected light from the amorphous region differs from the intensity of reflected light from the crystalline region, the intensity changes of reflected light are converted into electric signals, and then the converted electric signals are subjected to analog-to-digital conversion so as to read out recorded information.

Incidentally, it is also possible to carry out read/write of information by utilizing a transition between a metastable crystalline phase such as a martensite phase and a stable crystalline phase or a transition between metastable crystalline phases, in addition to the phase change between the crystalline phase and the amorphous phase.

(Approaches to Improve Recording Density)

For increasing an amount of information that can be recorded in a single recording medium, i.e., for increasing recording capacity, it is conceivable to improve recording density by the two methods given below.

One method for improving the recording density is to reduce a pitch of the recording marks in the track direction. However, if the degree of size reduction proceeds, a region in which the pitch of the recording marks is made smaller than the size of the read beam is arrived at, with the result that it is possible for two recording marks to be included temporalily in the read beam spot. Where the recording marks are sufficiently apart from each other, the read signals can be greatly modulated so as to make it possible to obtain signals having high amplitude. However, where the recording marks are positioned close to each other, signals having low amplitude are obtained, with the result that errors tend to be generated when the obtained signals are converted into the digital data.

The other method of improving the recording density is to reduce a track pitch. In this method, it is possible to increase the recording density while avoiding significant influence given by degradation in signal intensity caused by the reduction in the mark pitch noted above. However, this method gives rise to a problem of a so-called "cross-erase" that, in a region in which the track pitch is substantially equal to or smaller than the size of the light beam, data on a certain track is degraded while the adjacent track is undergoing writing or erasing.

The cross-erase is caused by the phenomenon that the recording mark is irradiated directly with the periphery of a laser beam on the adjacent track, and the phenomenon that the heat flow in the write stage flows into the adjacent track so as to elevate the mark temperature and, thus, to degrade the shape of the mark. It is necessary to overcome these problems for increasing the recording density of the phase-change optical recording medium.

(Approach to Achieve High-Speed Recording)

High-speed recording is another requirement for the phase-change optical recording medium. For example, where video signals can be recorded in a time shorter than an actual viewing time, it is possible to realize easily a so-called "time-shift function" which is referred to as a function of viewing previous scenes in dubbing a distributed recording medium or in recording a broadcasting program. One of the factors for inhibiting the high-speed recording in the phase-change optical recording is the problem that the data fails to be erased completely when the crystallization is performed by a laser beam having an erase level of a relatively low power in the overwriting stage, i.e., the problem of an insufficient erasure rate. Since a recording mark passes through a laser spot at high speed, the temperature of the recording mark fails to be maintained for a sufficiently long time to fall within a range within which crystallization can be achieved, with the result that the data fails to be erased completely.

An idea of arranging a GeN-based interface film in contact with a phase-change optical recording film for accelerating crystallization so as to increase the erasure rate is disclosed in "Acceleration of crystallization process by nitride interface layer", Proceedings of The 10th Symposium on Phase Change Optical Information Storage, pp. 85-89, and in Japanese Patent Application KOKAI Publication No. 11-213446. However, according to the experiments conducted by the present inventors, it has been found that, in the phase-change optical recording medium having a GeN-based interface layer, a problem is generated in the write stage. The problem is based on the phenomenon that the peripheral portion of an initially melted region Im in the write stage is recrystallized, and an amorphous recording mark M is formed inside the recrystallized peripheral portion, as shown in FIG. 1. To be more specific, since it is necessary to melt a larger region in order to form a recording mark of a desired size, the cross-erase is to be promoted, with is a reverse effect in view of high-density recording. On the other hand, if the writing is performed with a laser power that is allowable in terms of the cross-erase, a problem is generated that the width of the recording mark to be formed is reduced so as to lower a carrier-to-noise ratio (CNR).

Such being the situation, it has been desired to develop a novel material for the interface film, which permits increased crystallization speed in erasing so as to overcome the problem in terms of the insufficient erasure rate and which also makes it possible to suppress the recrystallization of the melted region in writing.

(Increase in Recording Capacity by Dual-Layer Medium)

As another method for increasing the recording capacity, a method of superposing a plurality of information layers each containing a phase-change optical recording film is known. The particular method is disclosed in, for example, Japanese Patent Application KOKAI Publication No. 2000-322770. It should be noted that it is necessary for the first information layer positioned close to the light incident side to ensure at least about 50% of transmittance in order to prevent the light from being superfluously attenuated in accessing to the second information layer positioned remote from the light incident side. To this end, it is necessary to reduce the thickness of the recording film to about 5 to 8 nm. Since the thickness of the recording film is much reduced, the retention time required for the crystallization is made long, with the result that the recorded information fails to be erased completely in ordinary high-speed recording.

As a measure for overcoming the difficulty, it is disclosed that a method of substituting Sn for a part of the GeSbTe recording film is effective, in Proceedings of The 12th Symposium on Phase-change Optical Information Storage PCOS 2000, pp. 36-41. Also, it is disclosed that a method of substituting Bi, In, Sn or Pb for a part of the GeSbTe recording film is effective, in Japanese Patent Application KOKAI Publication No. 2001-232941.

Where the thickness of the recording film exceeds 15 nm, a temperature difference is generated between the upper portion of the recording film positioned closer to the reflection film and cooled at a high rate and the lower portion of the recording film. Therefore, crystal nuclei are generated on the upper portion of the recording film and the crystal nuclei grow so as to cause the entire recording film to be crystallized. However, where the thickness of the recording film is small, a sufficient temperature difference is not generated between the upper and lower portions of the recording film. Thus, for compensating the crystallization speed that has been lowered in accordance with the reduction in the thickness of the recording film, it is insufficient to adjust the composition of the recording film material, and it is necessary to arrange a film producing the effect of accelerating crystallization at the interface with the recording film. According to the Proceedings of The 12th Symposium on Phase change Optical Information Storage, it is effective to arrange, for example, a GeN interface film. However, it has been found as a result of research conducted by the present inventors that, in the combination of a thin recording film having a thickness of about 5 to 8 nm and a conventional interface film such as the GeN film, the cross-erase is generated to degrade read signal characteristics, with the result that errors are generated frequently in converting the read signals into digital data. Particularly, the signal characteristics are prominently degraded in the case where the thickness of the GeN interface film is smaller than about 5 nm.

On the other hand, the reflection film serves to cool the recording film that has been heated by the absorption of the recording light. However, since it is necessary to decrease the thickness of the reflection film in the semi-transparent information layer (the first information layer), the cooling function of the reflection film becomes insufficient, with the result that the read signal characteristics are degraded. As a measure against the difficulty, an idea of forming a heat sink film on the reflection film is disclosed in, for example, Japanese Patent Application KOKAI Publication No. 2000-222777. Also, it is reported that signal characteristics are improved in the case of arranging a heat sink film having a thickness of about 100 nm and made of AlN having very high heat conductivity, in Proceedings of ISOM/ODS 2002, pp. 234-236. However, it has been found as a result of research conducted by the present inventors that recording sensitivity is degraded in the case of using a material having very high heat conductivity such as AlN for a heat sink film.

As described above, in the first information layer (semi-transparent information layer) of the dual-layer single-sided phase-change optical recording medium, it is necessary to make both of the recording film and the reflection film thinner than those of the ordinary medium. Such being the situation, it has been desired to develop an interface film permitting a high CNR and an erasure rate while maintaining the cross-erase to a low level and to optimize the thermal characteristics of the medium including those of the interface film and the heat sink film.

BRIEF SUMMARY OF THE INVENTION

An object of the present invention is to provide a phase-change optical recording medium, which makes it possible to ensure a sufficiently high CNR by suppressing cross-erase, and which also permits high-speed overwriting with a high recording density and a high capacity.

A phase-change optical recording medium according to an aspect of the present invention comprises: a phase-change optical recording film that permits reversible phase change between a crystalline phase and an amorphous phase upon irradiation with light; and an interface film formed of hafnium oxide, or a mixture of hafnium oxide and at least one oxide selected from the group consisting of cerium oxide, titanium oxide and zirconium oxide, and formed in contact with at least one surface of the phase-change optical recording film.

A phase-change optical recording medium according to another aspect of the present invention comprises: a semi-transparent, first information layer comprising a phase-change optical recording film, an interface film formed of at least one oxide selected from the group consisting of hafnium oxide and cerium oxide and formed in contact with at least one surface of the phase-change optical recording film, a semi-transparent reflection film, and a heat sink film; a second information layer; and a resin layer formed between the first information layer and the second information layer, in which heat conductivity of the heat sink film is at least 0.7 times as high as that of the interface film and not higher than 100 W/mK.

BRIEF DESCRIPTION OF THE SEVERAL VIEWS OF THE DRAWING

FIGS. 12A and 12B show optical characteristics of a semi-transparent information layer, including an interface film of $HfO_2$ and a heat sink film of $SiO_2$ and $TiO_2$, respectively, as a function of a thickness of a first interference film and a thickness of a second interference film.

DETAILED DESCRIPTION OF THE INVENTION

The phase-change optical recording medium according to the embodiments of the present invention will now be described more in detail. The phase-change optical recording medium according to the embodiments of the present invention includes an interface film formed on at least one surface of the phase-change optical recording film and containing hafnium oxide or cerium oxide. Incidentally, the expression "formed in contact with the phase-change optical recording film" is used unless a film not containing hafnium oxide or cerium oxide is formed intentionally between the phase-change optical recording film and the interface film. For example, even where a very thin oxide film having a thickness of 2 nm or less, which is naturally formed on the surface of the phase-change optical recording film during the deposition process, has been detected by, for example, Auger analysis, the interface film is regarded as being formed in contact with the phase-change optical recording film.

Figure 2:
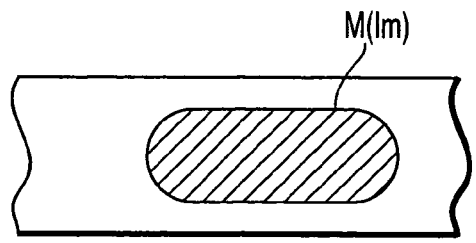
FIG. 2 shows an amorphous mark in a phase-change optical recording medium according to an embodiment of the present invention.

Since the phase-change optical recording medium according to the embodiments of the present invention has the interface film containing hafnium oxide or cerium oxide formed in contact with a phase-change optical recording film, it is possible to make the size of a recording mark M substantially equal to the size of an initially melted region in the write stage, as shown in FIG. 2.

Figure 3:
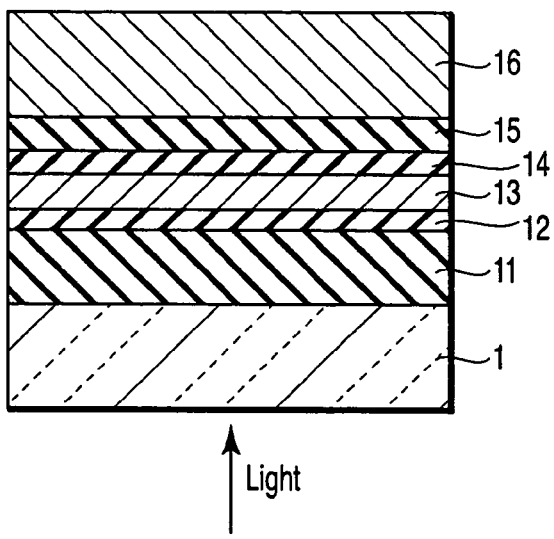
FIG. 3 is a cross-sectional view showing the stacked structure of a phase-change optical recording medium according to one embodiment of the present invention.

FIG. 3 is a cross-sectional view showing a stacked structure of a phase-change optical recording medium according to one embodiment of the present invention. In the phase-change optical recording medium shown in FIG. 3, the first interference film 11, the lower interface film 12, the phase-change optical recording film 13, the upper interface film 14, the second interference film 15 and the reflection film 16 are stacked successively in the order mentioned on the substrate 1.

Incidentally, FIG. 3 shows the basic structure of the phase-change optical recording medium of the present invention. However, the structure of the phase-change optical recording medium of the present invention is not limited to the structure shown in FIG. 3. For example, in the phase-change optical recording medium shown in FIG. 3, the interface films 12, 14 are formed in contact with the both surfaces of the phase-change optical recording film 13. However, it suffices for the interface film to be formed in contact with at least one surface of the phase-change optical recording film 13. Also, it is possible to form another dielectric film between the second interference film 15 and the reflection film 16 or to use a plurality of films for forming the reflection film 16. Further, various modifications are conceivable as described herein later in detail.

The recording film 13 in the phase-change optical recording medium is irradiated with light passing through the substrate 1. In many cases, the phase-change optical recording medium is designed to permit the reflectance (Ra) of the amorphous portion and the reflectance (Rc) of the crystalline portion to have a relationship of Ra<Rc, though it is possible to design the phase-change optical recording medium to have a relationship of Ra>Rc, as described herein later.

Hafnium oxide contained in the interface film is expressed as $HfO_2$ in terms of the stoichiometric composition. However, it suffices for the hafnium oxide used in the embodiments of the present invention to have a composition represented by the formula $HfO_x$, where $1.8 \leq x \leq 2.2$.

The present inventors have conducted extensive research using known interface film materials effective for accelerating crystallization of the recording film such as germanium nitride (GeN), silicon carbide (Si—C) and silicon nitride (Si—N). It has been found that there is a trade-off relationship that a CNR is lowered in the case of using a material having a high effect of accelerating the crystallization and a material that permits a high CNR is poor in the effect of accelerating the crystallization. On the other hand, it has been found that, in the case of using hafnium oxide for the interface film, it is possible to obtain a high CNR and a high effect of accelerating the crystallization.

It has been found that the effect similar to that described above can also be obtained in the case of using a mixture comprising hafnium oxide and at least one oxide selected from the group consisting of cerium oxide ($CeO_2$), titanium oxide ($TiO_2$) and zirconium oxide ($ZrO_2$) for the interface film. In the case of mixing hafnium oxide with an oxide of the divalent metal, it is possible to obtain a high CNR and a high effect of accelerating the crystallization. On the other hand, when it comes to the combination of hafnium oxide and an oxide of a pentavalent metal such as $Ta_2O_5$ or $Nb_2O_5$ or an oxide of a trivalent metal such as $Mo_2O_3$ or $Cr_2O_3$, it is impossible to achieve both a high CNR and a high effect of accelerating the crystallization. The mechanism that the combination of hafnium oxide and an oxide of a divalent metal can produce the particularly prominent effects as described above has not yet been clarified sufficiently. However, the reason for the above result is probably due to the fact that the bonding between the divalent metal and oxygen is stronger than the bonding between the pentavalent metal or the trivalent metal and oxygen.

In the case of using an interface film formed of a mixture comprising hafnium oxide and at least one oxide selected from the group consisting of cerium oxide, titanium oxide and zirconium oxide, it is possible to control easily the refractive index and/or the heat conductivity characteristics of the interface film while maintaining a satisfactory function of accelerating the crystallization.

The recording film included in the phase-change optical recording medium absorbs light so as to be heated, and the heat is transmitted through the upper and lower films so as to cause the recording film to be cooled. The degree of heating and cooling of the recording film is changed in accordance with not only factors such as a light output, a linear velocity of the recording medium, an irradiating time with light and a crystallization speed of the recording film but also heat conductivity characteristics of the films formed on the upper and lower sides of the recording film, which determines whether the recording film is rendered amorphous or crystalline. It follows that, in order to form satisfactory recording marks on the recording film and to obtain sufficient erasure characteristics of the recording film at a desired linear velocity, it is desirable to control appropriately the heat conductivity of each of the films formed on the upper and lower sides of the recording film.

When it comes to the interface film formed of the oxide mixture referred to above, the refractive index and/or the heat conductivity characteristics can be controlled in accordance with the types and the mixing ratio of the oxide materials which are to be mixed, with the result that the design of the film construction of the recording medium can be markedly facilitated. As a result, it is possible to employ a stacked structure in which the interference film (also called a protective film) made of $ZnS:SiO_2$, i.e., a mixture of ZnS and $SiO_2$, is omitted, although it has been considered to be indispensable in the conventional phase-change optical recording medium. In the phase-change optical recording medium having the particular stacked structure, it is possible to decrease the total number of films (or the number of deposition processes) by the number of the interference film to be omitted, which improves productivity.

Figure 4:
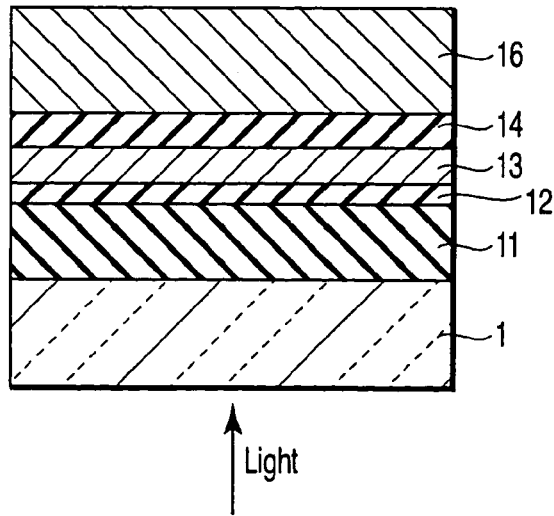
FIG. 4 is a cross-sectional view showing the stacked structure of a phase-change optical recording medium according to another embodiment of the present invention.
Figure 5:
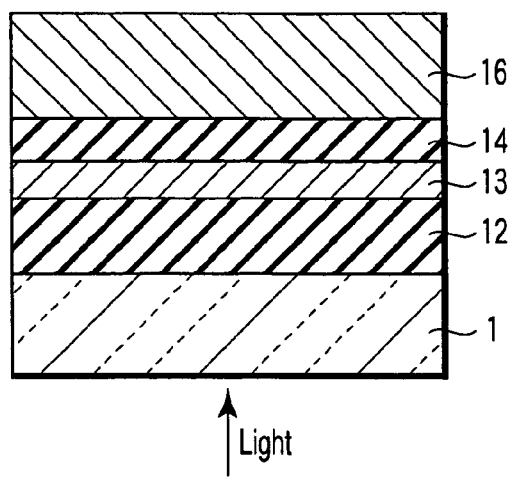
FIG. 5 is a cross-sectional view showing the stacked structure of a phase-change optical recording medium according to another embodiment of the present invention.

FIGS. 4 and 5 are cross-sectional views each showing a stacked structure of the phase-change optical recording medium according to another embodiment of the present invention. In each of these phase-change optical recording media, at least one interference film is omitted from the stacked structure shown in FIG. 3.

The phase-change optical recording medium shown in FIG. 4 has a structure that the first interference film 11, the lower interface film 12, the phase-change optical recording film 13, the upper interface film 14 and the reflection film 16 are stacked in the order mentioned on the substrate 1. In the phase-change optical recording medium shown in FIG. 4, the interference film on the side of the reflection film 16 relative to the recording film 13 is omitted from the stacked structure shown in FIG. 3.

The phase-change optical recording medium shown in FIG. 5 has a structure that the lower interface film 12, the recording film 13, the upper interface film 14 and the reflection film 16 are stacked in the order mentioned on the substrate 1. In the phase-change optical recording medium shown in FIG. 5, the interference films on the light incident side and on the side of the reflection film 16 relative to the recording film 13 are omitted from the stacked structure shown in FIG. 3.

In the embodiments of the present invention, it is desirable to use, for example, GeSbTe for the phase-change optical recording film. In particularly, a prominent effect can be obtained in the case of using the interface film specified in the present invention in combination with a GeSbTe phase-change optical recording film having a composition close to a so-called pseudo-binary system, which can be represented by $(GeTe)_a(Sb_2Te_3)_b$, preferably a GeSbTe phase-change optical recording film having a composition close to the pseudo-binary system and containing Ge in an amount of at least 20 atomic %, and more preferably a GeSbTe phase-change optical recording film having a composition close to the pseudo-binary system and containing Ge in an amount of at least 30 atomic %.

To be more specific, when a material used for the phase-change optical recording film is represented by the general formula $Ge_xSb_yTe_z$, where x+y+z=100, it is desirable to use a composition falling within a range defined by x=55 and z=45; x=45 and z=55; x=20, y=20 and z=60; and x=20, y=28 and z=52 in the GeSbTe ternary phase diagram.

It is more desirable to use a composition falling within a range defined by x=55 and z=45; x=45 and z=55; x=25, y=16 and z=59; and x=25, y=24 and z=51 in the GeSbTe ternary phase diagram.

Also, for the phase-change optical recording film, it is possible to use a material having Bi and/or Sn substituted for a part of the GeSbTe material of the composition range described above. The material referred to above is represented by the general formula, $(Ge_wSn_{(1-w)})_x(Sb_yBi_{(1-y)})_y Te_z$, where x+y+z=100, $0 \leq w<0.5$ and $0 \leq v<0.7$. If the substitution ratio w of Sn for Ge is not lower than 0.5, the crystallization speed is rendered excessively high so as to cause the recrystallization after melting to be prominent, resulting in failure to form amorphous marks stably. Also, if the substitution ratio v of Bi for Sb is not lower than 0.7, the crystallization speed is also rendered excessively high so as to cause the recrystallization after melting to be prominent, resulting in failure to form amorphous marks stably.

Further, it is possible to use a recording film material prepared by adding traces of elements, e.g., Co, V and Ag, other than Sn and Bi, to GeSbTe such that the effect of the present invention is not impaired.

In the embodiments of the present invention, as a material for the first and second interference films, a dielectric material or a mixture thereof, which is substantially transparent and has appropriate heat conductivity, may be used. To be more specific, the material for the interference films includes, for example, ZnS—$SiO_2$, $SiO_2$, SiO, Si—O—N, Si—N, $Al_2O_3$, Al—O—N, $TiO_2$, Ta—N, $Ta_2O_5$, Ta—O—N, Zn—O, ZnS, $ZrO_2$, Zr—O—N, Zr—N, Cr—O, Mo—O, W—O, V—O, Nb—O, Ta—O, In—O, Cu—O, Sn—O and In—Sn—O.

Also, it is possible to design a phase-change optical recording medium of a so-called "Low-to-High" polarity, in which the reflectance of the amorphous portion is higher than the reflectance of the crystalline portion, by allowing the interference film on the light incident side to be formed of a stacked structure consisting of a plurality of interference films. For example, it is possible to realize the Low-to-High polarity by allowing the interference film on the light incident side to be of a three-layered structure of $ZnS:SiO_2/SiO_2/ZnS:SiO_2$ or of a two-layered structure of $ZnS:SiO_2/SiO_2$ and by designing appropriately the thickness of each film.

The appropriate thickness of each layer included in the phase-change optical recording medium shown in each of FIGS. 3 to 5 will now be described.

In order to design the phase-change optical recording medium as shown in FIG. 3 such that the reflectance (Ra) of the amorphous portion is rendered lower than the reflectance (Rc) of the crystalline portion, it is desirable for the total thickness of the first interference film 11 and the lower interface film 12 on the light incident side to fall within a range of between 30 nm and 200 nm, for the thickness of the phase-change optical recording film 13 to be 20 nm or less, for the total thickness of the upper interface film 14 and the second interference film 15 on the side of the reflection film to be 5 nm or more, and for the thickness of the reflection film 16 to fall within a range of between 30 nm and 400 nm. If the thickness of the phase-change optical recording film 13 exceeds 20 nm, the cross-erase tends to take place easily.

The thicknesses of the films described above can also be applied to the cases where the interference film is omitted from the stacked structure consisting of the interference film and the interface film into the interface film alone as shown in FIGS. 4 and 5. Where the interference film is not formed on the light incident side, it is desirable for the lower interface film 12 to have a thickness falling within a range of between 30 nm and 200 nm. Where the interference film is not formed on the side of the reflection film, it is desirable for the upper interface film 14 to have a thickness of 5 nm or more.

Also, in the case of using a stack of a plurality of dielectric films for a phase-change optical recording medium of the Low-to-High polarity (Ra>Rc) as described above, it is desirable to determine the thickness of each dielectric film in a manner to satisfy desired reflectance under the condition that the total thickness of the plural interference films and the lower interface film 12 to fall within a range of between 30 nm and 200 nm.

It is possible for the phase-change optical recording medium according to another embodiments of the present invention to be a dual-layer single-sided recording medium having two phase-change optical recording films capable of independently writing, erasing and reading data by irradiation with light incident on one side.

Figure 6:
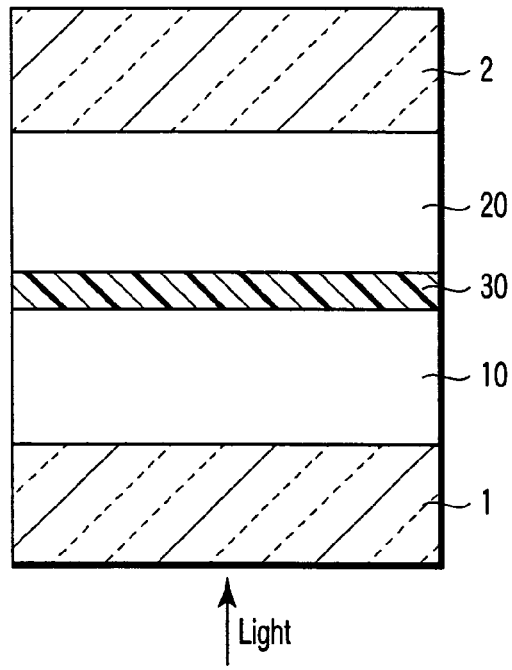
FIG. 6 is a cross-sectional view showing the stacked structure of a dual-layer single-sided recording medium according to another embodiment of the present invention.

FIG. 6 is a cross-sectional view showing the stacked structure of a phase-change optical recording medium (dual-layer single-sided recording medium) according to another embodiments of the present invention. The phase-change optical recording medium shown in FIG. 6 having a structure in which the first substrate 1 having the first information layer 10 formed thereon and the second substrate 2 having the second information layer 20 formed thereon are bonded to each other such that the first and second information layers 10 and 20 are allowed to face each other with the UV curable resin layer 30 interposed between them. It is possible to employ the stacked structure as shown in, for example, FIGS. 3 to 5 for each of the first and second information layers 10 and 20. Incidentally, prominent effects can be obtained by simply arranging the interface film in contact with the recording film included in the first information layer 10 positioned on the light incident side.

Figure 7:
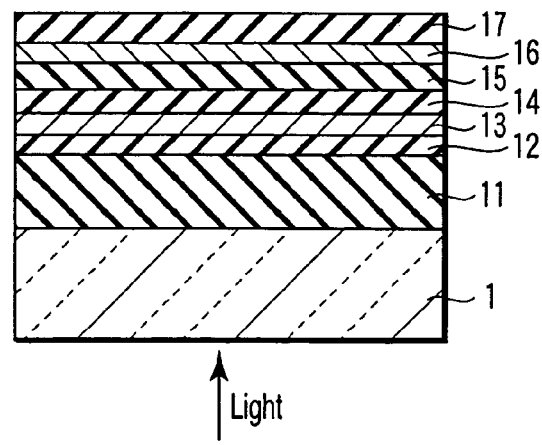
FIG. 7 is a cross-sectional view showing the stacked structure of a dual-layer single-sided recording medium according to still another embodiment of the present invention.

FIG. 7 shows an example of a stacked structure of a first information layer. The first information layer shown in FIG. 7 has a structure that the first interference film 11, the lower interface film 12, the phase-change optical recording film 13, the upper interface film 14, the second interference film 15, the reflection film 16 and the heat sink film 17 are arranged on the substrate 1.

Figure 8:
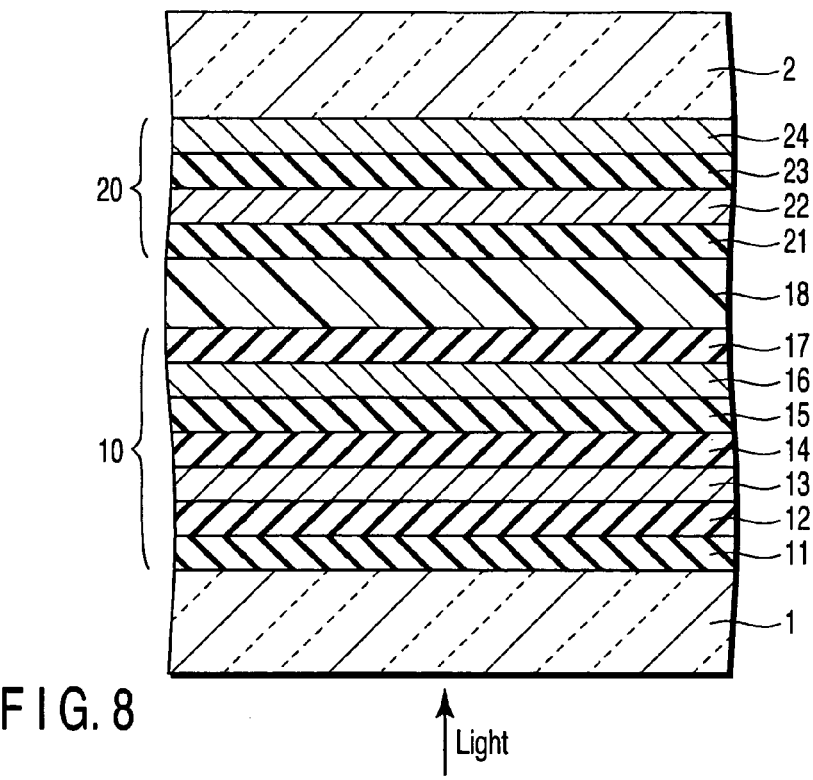
FIG. 8 is a cross-sectional view showing the stacked structure of a dual-layer single-sided phase-change optical recording medium according to still another embodiment of the present invention.

FIG. 8 shows a dual-layer single-sided phase-change optical recording medium according to one embodiment of the present invention. As shown in the drawing, on the first substrate 1, the first interference film 11, the lower interface film 12, the phase-change optical recording film 13, the upper interface film 14, the second interface film 15, the semi-transparent reflection film 16, and the heat sink film 17, are deposited successively so as to form the first information layer (semi-transparent information layer) 10. In addition, on the second substrate 2, the reflection film 24, the second interference film 23, the phase-change optical recording film 22, and the first interference film 21 are deposited successively so as to form the second information layer 20. The first substrate 1 and the second substrate 2 are arranged in a manner that the first and second information layers to face each other are bonded with a UV curable resin layer 30 interposed between them. The recording films are irradiated with light incident on the first substrate 1.

Incidentally, the structure of the dual-layer single-sided optical recording medium is not limited to that shown in FIG. 8. For example, it is possible to form a plurality of dielectric films between the first substrate 1 and the lower interface film 12. It is also possible to omit the first interference film 11 and the second interference film 15 and to form the upper interface film 14 alone between the phase-change optical recording film 13 and the reflection film 16. Further, it is possible for the reflection film 16 to be formed of a plurality of films.

In the dual-layer single-sided optical recording medium, writing, erasing and reading for the first information layer 10 are carried out by the light transmitted through the first substrate 1, and writing, erasing and reading for the second information layer 20 are carried out by the light transmitted through the first information layer 10. Therefore, the first information layer on the light incident side is rendered semi-transparent to the recording light. The expression that the first information layer is semi-transparent means herein that the transmittance for the recording light is 40 to 70% in the first information layer. In order to make the first information layer semi-transparent, it is desirable for the recording film to have a thickness of 5 to 8 nm and for the reflection film to have a thickness of 5 to 10 nm.

As described above, in order to increase the transmittance of the first information layer 10, it is effective to decrease the thickness of each of the recording film and the reflection film. If the thickness of each of these films is decreased, however, the cooling effect is lowered. As a result, recrystallization of the melted region is rendered prominent in writing so as to give rise possibly to the inconvenience that it is difficult to perform the writing at an ordinary linear velocity. Such being the situation, for the first information layer 10, it is desirable to employ the stacked structure capable of making up for the decrease of the cooling effect.

In the first information layer of the dual-layer single-sided medium, it is desirable for the total thickness of the first interference film 11 and the lower interface film 12 on the light incident side to fall within a range a between 30 nm and 200 nm, for the thickness of the phase-change optical recording film 13 to be 8 nm or less, for the total thickness of the upper interface film 14 and the second interference film 15 on the side of the reflection film to fall within a range of between 5 nm and 100 nm, for the thickness of the reflection film 16 to be 10 nm or less, and for the thickness of the heat sink film 17 to be 100 nm or less.

Figure 1:
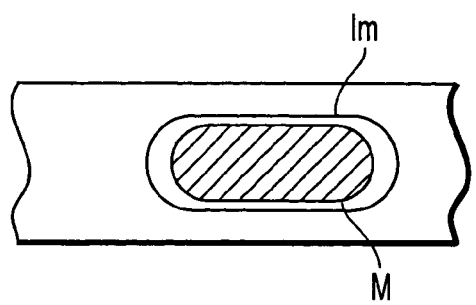
FIG. 1 shows an amorphous mark in a conventional phase-change optical recording medium.

In the first information layer of the dual-layer single-sided medium, it is also possible to employ a stacked structure that an interference film is omitted as in FIGS. 4 and 5 in which one or two interference films are omitted from the stacked structure shown in FIG. 1. In this case, it is desirable for the lower interface film 12 on the light incident side to have a thickness falling within a range of between 30 nm and 200 and for the upper interface film 14 on the side of the reflection film to have a thickness falling within a range of between 5 nm and 30 nm.

Incidentally, in the first information layer of the dual-layer single-sided medium, it is also possible to omit as required the metal reflection film. In this case, it is desirable to design the refractive index such that it is possible to obtain prescribed reflectance in the interface between, for example, the UV curable resin layer 30 and the interference film in contact with the resin layer 30.

The materials used for the dual-layer single-sided phase-change optical recording medium according to the embodiments of the present invention will now be described.

As described previously, a material containing hafnium oxide or cerium oxide is used for the interface film. Also, the materials noted above are used for the first and second interference films and the phase-change optical recording film.

As a material for the heat sink film, a dielectric material or a mixture thereof, which is substantially transparent and has appropriate heat conductivity, is used. To be more specific, the material for the heat sink film includes $Al_2O_3$, $SiO_2$, SiO, Si—O—N, Si—N, Al—O—N, $TiO_2$, Ta—N, $Ta_2O_5$, Ta—O—N, Zn—O, ZnS, $ZrO_2$, Zr—O—N, Zr—N, Cr—O, Mo—O, W—O, V—O, Nb—O, Ta—O, In—O, Cu—O, Sn—O and In—Sn—O.

The present inventors have conducted recording-reproducing experiments in respect of phase-change optical recording media, in which the thickness of the phase-change optical recording film included in the first information layer was set at about 6 nm, and an interface film having a thickness not larger than 5 nm was formed by using materials which are known to produce the effect of accelerating the crystallization of the phase-change optical recording film such as germanium nitride (GeN), chromium oxide (Cr—O), silicon carbide (Si—C), and silicon nitride (Si—N) as well as hafnium oxide and cerium oxide.

As a result, it has been found that there is a trade-off relationship that a CNR is lowered in the case of using an interface film made of a material producing the effect of accelerating crystallization and that the effect of accelerating the crystallization is rendered poor in the case of using a material that brings about a high CNR. However, in the case of using hafnium oxide or cerium oxide for the interface film, the degree of the trade-off is rendered particularly low so as to make it possible to obtain a high CNR and a high effect of accelerating the crystallization.

The mechanism of producing the particularly prominent characteristics in the case of using hafnium oxide or cerium oxide has not yet been clarified. However, it is considered that the bonding of hafnium or cerium with oxygen is stronger than the bonding of another metal with oxygen so as to produce the particularly prominent characteristics. It was believed in the past that, in the case of using a substance having intense bonding strength and a high hardness for the interface film, the melted recording film is shrunk in the medium including a thick recording film so as to bring about a partial peeling between the recording film and the interface film. On the other hand, the semi-transparent information layer has a thin recording film of 8 nm or less, and the shrinkage of the melted recording film is small and, thus, is unlikely to be peeled off. Therefore, satisfactory characteristics can be exhibited in the case of a semi-transparent information layer even if hafnium oxide or cerium oxide having high hardness is used for the interface film.

It is possible to add another material to the interface film in order to control the refractive index and/or the heat conducting characteristics while maintaining the satisfactory function of accelerating the crystallization. In the phase-change optical recording medium, the recording film absorbs light so as to generate heat, and the heat thus generated is transmitted into the upper and lower layers so as to be cooled. Whether the recording film is rendered amorphous or crystallized is determined depending on the balance among the power of the irradiating recording light, the heat generation dependent on the linear velocity and the light irradiation time, the heat conductive characteristics of the upper and lower films of the recording film, and the crystallization speed of the recording film. It follows that, in order to form a satisfactory recording mark and to obtain a sufficient erase characteristics at a desired linear velocity, it is important to control accurately the heat conductivity in the upper and lower films of the recording film. In the embodiments of the present invention, it is possible to control the refractive index and the heat conductive characteristics of the interface film by suitably selecting the-type and the mixing ratio of the materials mixed with hafnium oxide or cerium oxide, with the result that the design of the structure of the medium can be markedly facilitated. It is also possible to substitute the material of an interface film for the ZnS: $SiO_2$ interference film which was considered to be indispensable in the past. In this case, it is possible to decrease the number of film deposition processes so as to make it possible to provide a medium excellent in productivity.

The material that can be mixed with hafnium oxide or cerium oxide for the interface film includes, for example, AlN, $Al_2O_3$, $SiO_2$, SiO, Si—O—N, Si—N, Al—O—N, Si—C, $TiO_2$, Ta—N, $Ta_2O_5$, Ta—O—N, Zn—O, ZnS, $ZrO_2$, Zr—O—N, Zr—N, Cr—O, Mo—O, W—O, V—O, Nb—O, Ta—O, In—O, Cu—O, Sn—O and In—Sn—O. The interface film may comprise 50 mol % or less of at least one component selected from the above materials. In particular, it is desirable to mix Si—C with hafnium oxide or cerium oxide in order to maintain the mechanical strength of hafnium oxide and cerium oxide.

The present inventors have conducted comparative experiments by using materials having various heat conductivities for the heat sink film. As a result, it has been found that it is desirable for the heat conductivity of the heat sink film to be at least 0.7 times as high as that of the interface film, more preferably, to be higher than that of the interface film, and to be not higher than about 100 W/mK.

Figure 9A:
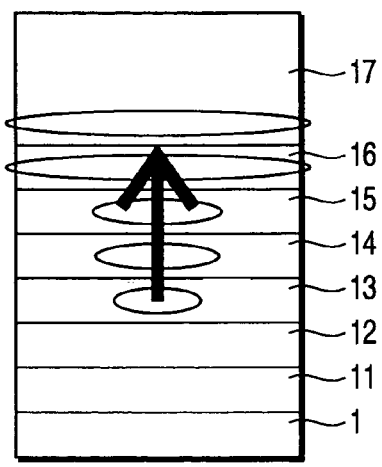
FIGS. 9A and 9B schematically show how heat conduction is carried out from a recording film included in a semi-transparent information layer, respectively.
Figure 9B:
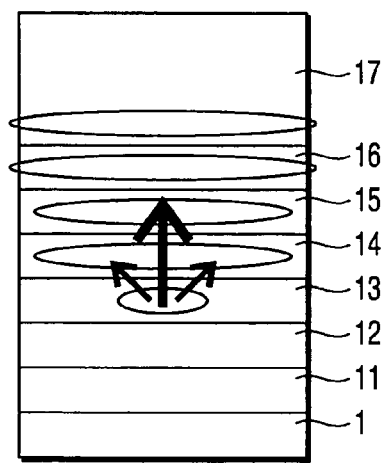

FIGS. 9A and 9B schematically show, respectively, how heat conduction is carried out when a recording film included in a semi-transparent information layer is heated by absorption of recording light. Ideally, it is desirable that the heat conduction in the perpendicular direction from the recording film toward the reflection film and heat sink film be large as shown in FIG. 9A because it is possible in this case to suppress influences given to the recording film in the adjacent tracks. However, where the heat conductivity of the heat sink film is lower than that of the interface film, the heat conduction in the in-plane direction within the interface film is rendered prominent in addition to the heat conduction in the perpendicular direction to the interface film, as shown in FIG. 9B. Since the interface film is in contact with the recording film, if the heat conduction takes place as shown in FIG. 9B, thermal influences may possibly be given to the recording film in the adjacent tracks. In other words, when data are recorded in the present track, the data that have already been recorded in the adjacent tracks are erased so as to cause cross-erase. It follows that, in order to prevent the cross-erase from being generated, the heat conductivity of the heat sink film preferably be higher than that of the interface film.

On the other hand, if the heat conductivity of the heat sink film is excessively high, recording sensitivity of the first information layer (semi-transparent information layer) is lowered. This is because, in the case of performing recording with ordinary light intensity under the condition that the heat conductivity of the heat sink film is excessively high, the recording film is made amorphous in the central portion of the beam where light intensity is high, while the recording film remains crystalline in the peripheral portion of the beam where the light intensity is not so high and thus sufficient melting does not take place. In this case, in order to make the recording film amorphous in the entire region of the light beam, it is necessary to carry out recording with light intensity higher than the ordinary light intensity. It follows that, in order to prevent the recording sensitivity of the semi-transparent information layer from being lowered, the heat conductivity of the heat sink film is required not to be excessively high. It has been clarified as a result of experiments that it is appropriate for the heat conductivity of the heat sink film to be not higher than 100 W/mK.

Incidentally, it is known to the art that the heat conductivity of a material under a thin film state differs from that under a bulk state. However, if the two different types of materials are compared in respect of the heat conductivity under the thin film state or under the bulk state, the relationship between these two materials in respect of the magnitude of the heat conductivity is substantially independent of the state of the material. Such being the situation, the heat conductivities referred herein represent those under the bulk state.

Then, optical characteristics of the optical recording medium were calculated in order to obtain appropriate design conditions for each of the films included in the phase-change optical recording medium according to the embodiments of the present invention. To be more specific, the optical characteristics (a refractive index and an attenuation coefficient) as well as the thickness for the material of each film were set at prescribed values, and simultaneous equations were formed in respect of the optical energy balance for every interface based on the energy conservation law, followed by solving the simultaneous equations. By these calculations, it is possible to obtain reflectance and transmittance of the entire multi-layered film as well as absorbance of each film. This method is known as the matrix method, as described in, for example, Hiroshi Kubota et al., "Wave Optics", Iwanami Shoten Publishers, 1971. Here, the reflectance and the transmittance of the first information layer (semi-transparent information layer) were calculated on an assumption that a light beam having a wavelength of 405 nm is incident on the phase-change optical recording medium shown in FIG. 8.

In the followings, suitable ranges of the refractive index and the thickness of each film were examined based on the reflectance Rc when the recording film is in a crystalline phase, the reflectance Ra when the recording film is in an amorphous phase, the contrast (Rc–Ra)/(Rc+Ra), and the average transmittance of the recording film under the crystalline phase or the amorphous phase. It is desirable that the change in each of Rc, Ra and the average transmittance be small even if the refractive index and the thickness of each film are changed. Also, it is desirable that the contrast exhibits a high value when the refractive index and the thickness of each film fall within suitable ranges.

The present inventors have found first that it is desirable that the refractive index of the heat sink film be close to the refractive index of a UV curable resin in contact with the heat sink film. To be more specific, it is desirable that the difference between the refractive index of the heat sink film and that of the UV curable resin be 0.5 or less and, more preferably, be 0.3 or less. This will now be described in detail.

The optical constants were calculated in respect of the optical recording medium having a stacked structure in which a first interference film $ZnS:SiO_2$, a lower interface film $HfO_2$, a phase-change optical recording film GeSbTeBi, an upper interface film $HfO_2$, a second interference film $ZnS:SiO_2$, a reflection film AgPdCu, a heat sink film and a UV curable resin are formed on a first substrate. The refractive index $n_r$ of the UV curable resin was set to 1.52. The refractive index $n_{hs}$ of the heat sink film was set to 1.8 or 2.7.

Graphs relating to the combinations of a thickness of the second interference film ($ZnS:SiO_2$) as an x-coordinate and a thickness of the heat sink film as a y-coordinate were prepared in respect of the first information layer (semi-transparent information layer) included in the optical recording medium using heat sink films differing from each other in the refractive index. In a case where satisfactory optical characteristics can be obtained if the thickness of the first interference film ($ZnS:SiO_2$) is set appropriately, the point corresponding to the particular combination is plotted in the graph. Incidentally, the satisfactory optical characteristics referred to above denote that the contrast of at least 0.8 and the average transmittance of at least 50% are satisfied.

Figure 10A:
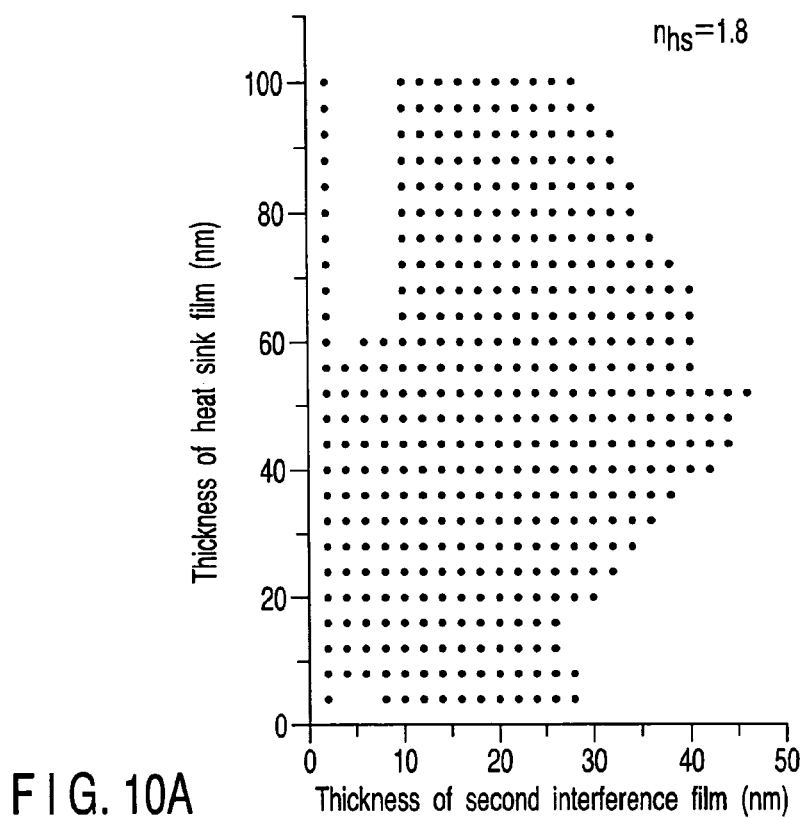
FIGS. 10A and 10B show combinations of a thickness of a second interference film and a thickness of a heat sink film which brings about satisfactory optical characteristics for a semi-transparent information layer, where a refractive index of the heat sink film is 1.8 and 2.7, respectively.
Figure 10B:
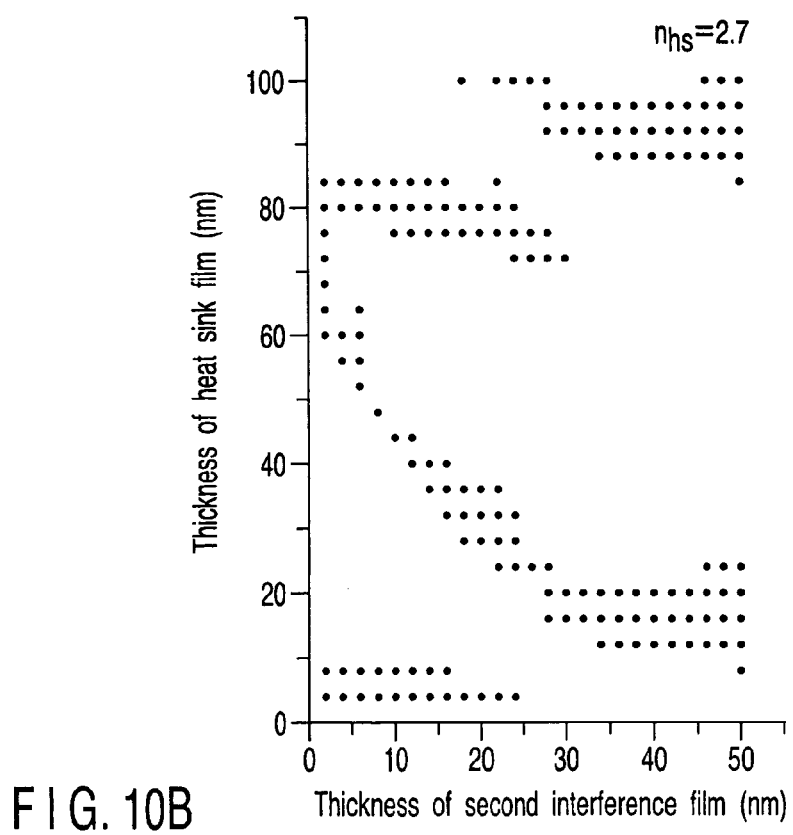

The experimental data are given in FIG. 10A [$n_{hs}$=1.8] and FIG. 10B [$n_{hs}$=2.7]. FIG. 10A supports that, where $n_{hs}$ is close to $n_r$, it is possible to obtain satisfactory optical characteristics even if the thickness of each of the second interference film and the heat sink film are changed over a considerably wide range. In particular, satisfactory optical characteristics can be obtained where the thickness of the second interference film falls within a desirable range of between 5 nm and 30 nm. On the other hand, FIG. 10B supports that, where $n_{hs}$ widely differs from $n_r$, the range of the film thickness within which satisfactory optical characteristics can be obtained is considerably limited.

The thermal characteristics of the phase-change optical recording medium are greatly dependent on not only the heat conductivity of each of the interface film and the heat sink film but also on the thickness of each of the films, in particular, the thickness of the interference film on the side of the reflection film. Therefore, the fact that satisfactory optical characteristics can be obtained over a wide range of the film thickness indicates that it is possible to obtain easily both the satisfactory optical characteristics and the thermal characteristics.

Then, changes in the optical constants of the optical recording medium caused by changes in the refractive index $n_{hs}$ and the thickness $t_{hs}$ of the heat sink film were examined. In this case, the optical constants were calculated in respect of the optical recording medium of a structure: $ZnS:SiO_2$ (50 nm)/$HfO_2$ (3 nm)/GeSbTeBi (6 nm)/$HfO_2$ (3 nm)/$ZnS:SiO_2$ (20 nm)/AgPdCu (6 nm)/heat sink film/UV curable resin. The refractive index $n_r$ of the UV curable resin was set at 1.52 or 1.8.

Figure 11A:
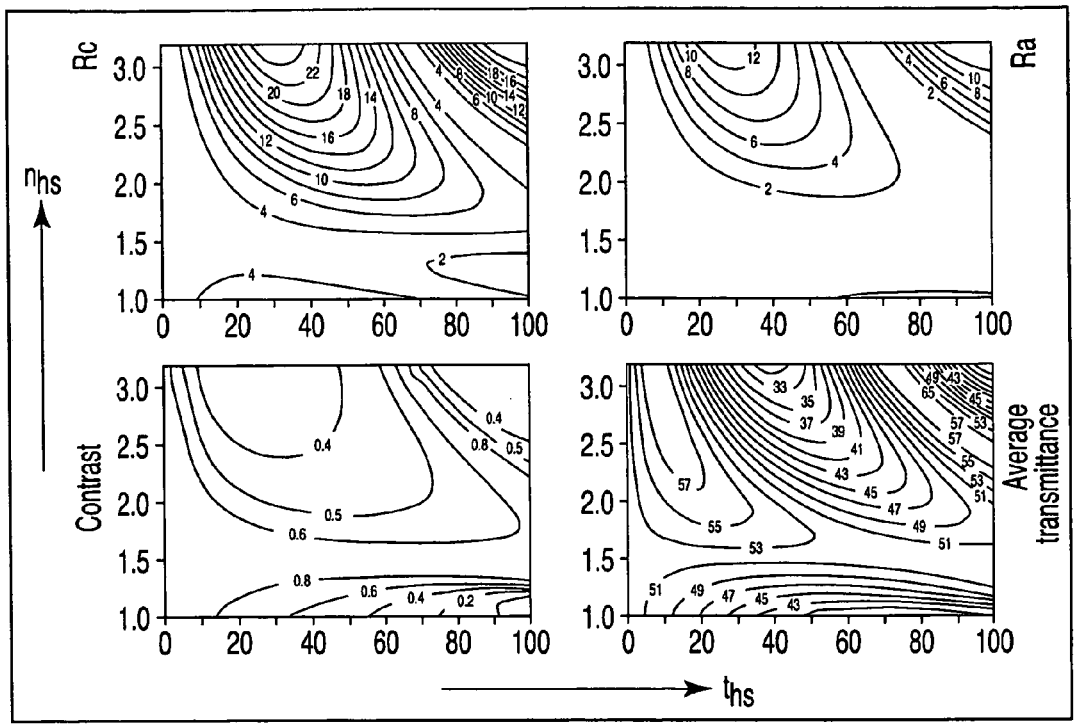
FIGS. 11A and 11B show optical characteristics of a semi-transparent information layer as a function of a refractive index and a thickness of a heat sink film, where a refractive index of UV curable resin used for bonding the information layers is 1.52 and 1.80, respectively.
Figure 11B:
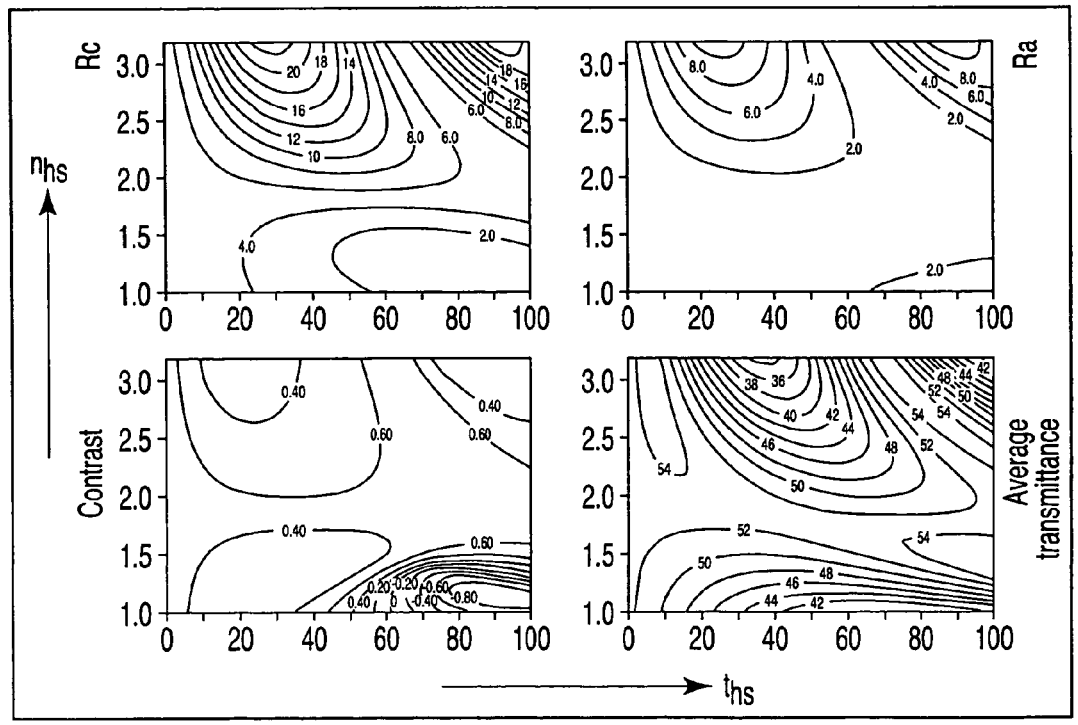

The changes in the optical characteristics (Rc, Ra, contrast, average transmittance) of the first information layer (semi-transparent information layer) were calculated in accordance with the refractive index $n_{hs}$ and the thickness $t_{hs}$ of the heat sink film where the absorption of the heat sink film was set at 0. FIGS. 11A and 11B show the results. FIG. 11A shows the results of the calculations, covering the case where the refractive index $n_r$ of the UV curable resin was set at 1.52, and FIG. 11B shows the results of the calculations, covering the case where the refractive index $n_r$ of the UV curable resin was set at 1.80.

Each of FIGS. 11A and 11B supports that, if the refractive index $n_{hs}$ of the heat sink film is close to the refractive index $n_r$ of the UV curable resin, the changes in the optical characteristics of the semi-transparent information layer caused by the changes in the thickness $t_{hs}$ of the heat sink film is small, i.e, the distribution of the contour lines is made sparse. In the semi-transparent information layer included in the phase-change optical recording medium according to the embodiments of the present invention, the cooling effect produced by the heat sink film is much higher than that produced by the reflection film or the interference film. As a result, the cooling effect of the entire semi-transparent information layer is greatly changed by the thickness $t_{hs}$ of the heat sink film. FIGS. 11A and 11B imply that, if $n_{hs}$ is close to $n_r$, the optical characteristics of the semi-transparent information layer are scarcely changed even if the thickness $t_{hs}$ of the heat sink film is changed in an attempt to optimize the cooling effect of the entire semi-transparent information layer. This is a very great advantage in terms of the thermal design.

The results given in FIGS. 10A, 10B, 11A and 11B support that it is desirable the value of $|n_{hs}-n_r|$ be smaller than 0.5, in particular, it is more desirable for that a relationship $n_r < n_{hs} < n_r + 0.3$ be satisfied.

Then, changes in the optical constants of the optical recording medium caused by changes in the thicknesses $t_{d1}$ and $t_{d2}$ of the first and second interference films were examined. In this case, the optical constants were calculated in respect of the optical recording medium of the structure: $ZnS:SiO_2$ (x nm)/$HfO_2$ (3 nm)/GeSbTeBi (6 nm)/$HfO_2$ (3 nm)/$ZnS:SiO_2$ (y nm)/AgPdCu (6 nm)/$SiO_2$ or $TiO_2$ (30 nm)/UV curable resin. The refractive index $n_r$ Of the UV curable resin was set at 1.52. The refractive index $n_{hs}$ of the heat sink film was about 1.5 for $SiO_2$ and about 2.9 for $TiO_2$. FIGS. 12A and 12B show the results. FIG. 12A shows the results of the calculations in the case where $SiO_2$ was used for the heat sink film, and FIG. 12B shows the results of the calculations in the case where $TiO_2$ was used for the heat sink film.

As shown in FIG. 12A, where the refractive index $n_{hs}$ of the heat sink film is close to the refractive index $n_r$ of the UV curable resin, the changes in the optical characteristics of the first information layer (semi-transparent information layer) is relative small, i.e., the distribution of the contour lines is made sparse, even if the thicknesses $t_{d1}$, $t_{d2}$ of the first and second interference films on the upper and lower sides of the recording film are much changed. On the other hand, FIG. 12B shows that, in the case where the refractive index $n_{hs}$ of the heat sink film is much different from the refractive index $n_r$ of the UV curable resin, the optical characteristics of the first information layer (semi-transparent information layer) is greatly changed, i.e., the distribution of the contour lines is made dense, even if the thicknesses $t_{d1}$, $t_{d2}$ of the first and second interference films on the upper and lower sides of the recording film are slightly changed.

Like the thickness of the heat sink film, the thickness of each of the first and second interference films on the upper and lower sides of the recording film greatly affects the cooling effect of the first information layer (semi-transparent information layer). Therefore, the fact that the optical characteristics of the first information layer (semi-transparent information layer) are not greatly dependent on the thickness of the interference films as shown in FIG. 12A provides a significant advantage in optimizing the cooling effect and in avoiding the changes in the characteristics caused by the unevenness of film thickness induced in the deposition process.

Figure 13A:
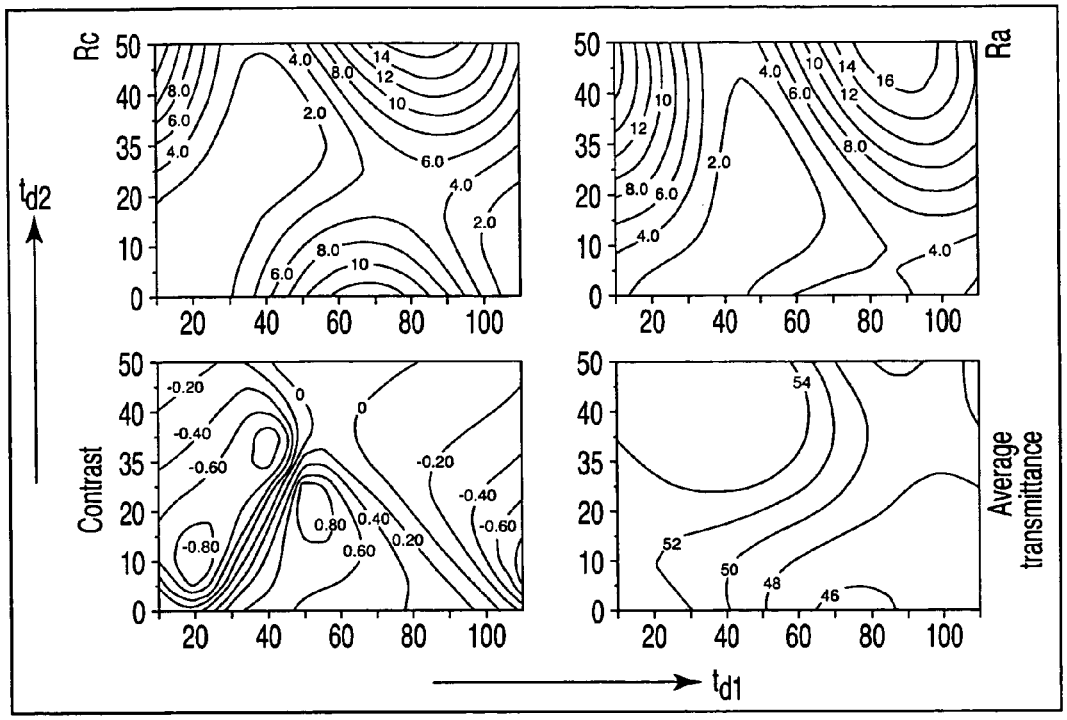
FIGS. 13A and 13B show optical characteristics of a semi-transparent information layer, including an interface film of $CeO_2$ and a heat sink film of $SiO_2$ and $TiO_2$, respectively, as a function of a thickness of a first interference film and a thickness of a second interference film.
Figure 13B:
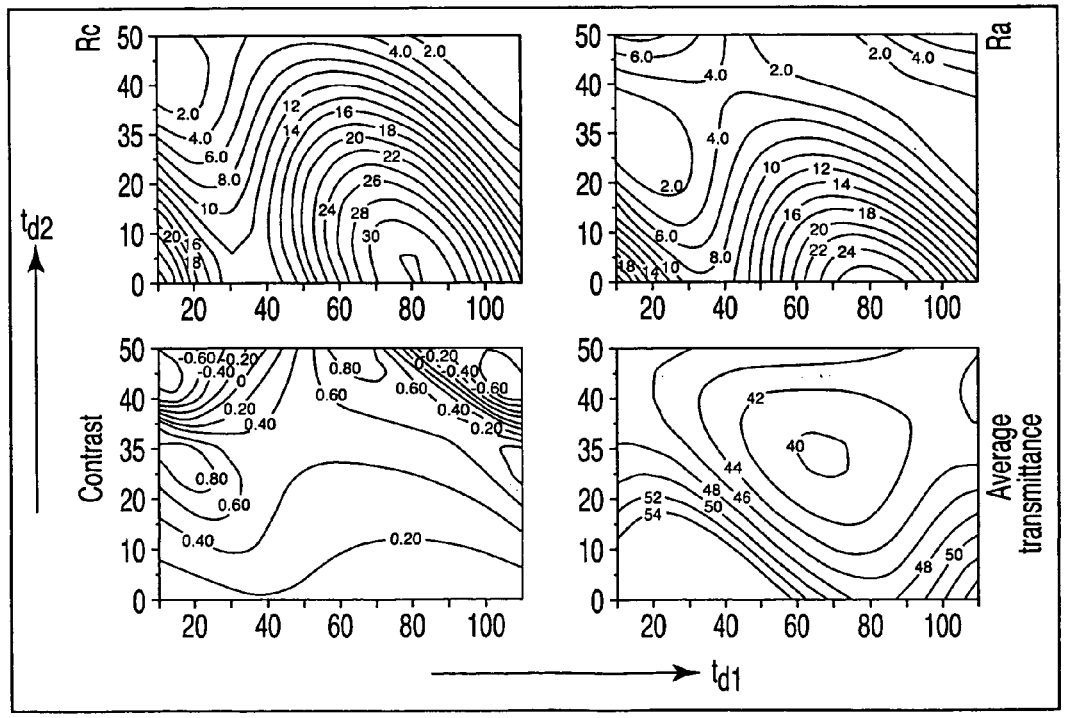

Then, changes in the optical characteristics of the optical recording medium caused by changes in the thicknesses $t_{d1}$ and $t_{d2}$ of the first and second interference films were examined as described above, using cerium oxide in place of hafnium oxide for the interface film. The optical constants were calculated in respect of the optical recording medium of the structure: $ZnS:SiO_2$ (x nm)/$CeO_2$ (3 nm)/GeSbTeBi (6 nm)/$CeO_2$ (3 nm)/$ZnS:SiO_2$ (y nm)/AgPdCu (6 nm)/$SiO_2$ or $TiO_2$ (30 nm)/UV curable resin. FIGS. 13A and 13B show the results. FIG. 13A shows the results of the calculations in the case where $SiO_2$ (refractive index: about 1.5) was used for the heat sink film, and FIG. 13B shows the results of the calculations in the case where $TiO_2$ (refractive index: about 2.9) was used for the heat sink film.

Like FIGS. 12A and 12B, FIGS. 13A and 13B also support that optical characteristics can be obtained over a wide range of the film thicknesses $t_{d1}$ and $t_{d2}$ if the refractive index $n_{hs}$ of the heat sink film is close to the refractive index $n_r$ of the UV curable resin.

In the phase-change optical recording medium according to still another embodiment of the present invention, it is possible to use an objective lens having a high NA of about 0.85 and to irradiate the phase-change optical recording film with a light beam transmitted through the transparent sheet having a thickness of about 0.1 mm. In this case, the reflection film 16, the second interference film 15, the upper interface film 14, the recording film 13, the lower interface film 12, and the first interference film 11 are deposited in the order mentioned on the substrate having a thickness of about 1.1 mm, followed by finally bonding a thin transparent sheet having a thickness of about 0.1 nm to the film stack so as to manufacture the desired phase-change optical recording medium.

It is also possible to irradiate the recording films of a dual-layer single-sided optical recording medium with a light beam transmitted through a thin transparent sheet having a thickness of about 0.1 mm. In this case, a reflection film, a second interference film, an upper interface film, a recording film, a lower interface film and a first interference film are deposited successively in the order mentioned on a substrate. Then, a thin layer of ultraviolet curable resin having a suitable thickness of 10 nm to 50 nm is formed by spin-coating. Further, the resin is cured under the state that a stamper for forming a groove is pressed against the resin, followed by peeling off the stamper. Subsequently, a reflection film, a second interference film, an upper interface film, a recording film, a lower interface film and a first interference film are deposited in the order mentioned on the cured resin. Still further, a thin transparent film having a thickness of about 0.1 mm is bonded or a resin film having a thickness of about 0.1 mm is formed. In this fashion, it is possible to form a dual-layer recording medium conforming to a high NA of about 0.85.

In the above particular structure, the interface films are formed on both sides of the recording film. However, it is possible to omit either one of the interface films without deviating from the subject matter of the present invention. Also, it is possible to omit the interference film, as required, so as to form the interface film alone.

EXAMPLES

Examples of the present invention will now be described.

Examples A to H and Comparative Examples

In each of the Examples, the phase-change optical disc was fabricated as follows. Specifically, a polycarbonate substrate having a thickness of 0.6 mm, formed by injection molding, was used as the substrate. Grooves were formed on the polycarbonate substrate at a pitch of 0.74 μm. Therefore, in the case of land and groove recording, the track pitch comes to 0.37 μm. Various films were successively deposited by sputtering on that surface of the polycarbonate substrate on which the grooves were formed. A so-called cluster type sputtering apparatus, in which each film is deposited in a different chamber, was used. A target having a composition corresponding to that of the film to be deposited was mounted in each of the chambers. Since the sputtering apparatus was provided with a vacuum transfer chamber, the substrate was transferred under vacuum until deposition processes of all the films were completed.

The phase-change optical recording medium thus obtained was mounted to an initializing apparatus so as to crystallize the recording film on the entire surface thereof. Then, the phase-change optical recording medium was evaluated by using a disc evaluating apparatus DDU-1000 manufactured by Pulstec Industrial Co., Ltd. The apparatus was equipped with a blue-violet semiconductor laser having a wavelength of 405 nm and an objective lens of NA 0.65. Experiments by the land and groove recording were carried out for the phase-change optical disc. Reflectance Rc of a crystalline portion and reflectance Ra of an amorphous portion were measured. Also, as described in the followings, an error rate of the data was evaluated by the bit error rate (bER) measurement, and read signal qualities were evaluated by analog measurements. A carrier-to-noise ratio (CNR), a DC erasure rate, and cross-erase (X-E) were determined by the analog measurements. Each of the measurements was performed in respect of the tracks on the groove (G) and the land (L).

In the land and groove recording, the track pitch becomes 0.37 μm as described above. The linear velocity of the disc was set at 6.7 m/s. In the following description, the 2T mark has a mark length of 0.21 μm, and the 9T mark has a mark length of 0.95 μm.

The bER measurement was carried out as follows. First, a mark train containing marks of 2T to 9T at random was overwritten 10 times in a target track. Then, the same random pattern was overwritten 10 times in each of the adjacent tracks on both sides of the target track, followed by measuring the bER on the target track.

The analog measurements were carried out as follows. First, a mark train containing marks of 2T to 9T at random was overwritten 10 times in a target track. Then, a 9T mark train (single pattern) was overwritten once in the target track. The carrier-to-noise ratio (CNR) of the signal frequency of the 9T marks was measured with a spectrum analyzer. Then, the target track was irradiated with a laser beam at an erasing power level during one rotation of the disc so as to erase the recording marks, followed by determining decrease in the signal level of the 9T marks. This is defined as a DC erasure rate. Also, the head was moved to a sufficiently remote track, and cross-erase (X-E) measurement was carried out as follows. First, a 2T mark train was overwritten 10 times in a target track, followed by measuring the signal level of the 2T marks with a spectrum analyzer. Then, a 9T mark train was overwritten 10 times in each of the adjacent tracks on both sides of the target track. Thereafter, the head was brought back to the target track where the 2T mark train was written so as to measure again the signal level of the 2T marks. The decrease in the signal level of the 2T marks relative to the level measured first was defined as the cross-erase value.

Examples A to F and Comparative Examples

Phase-change optical discs having various stacked structures were fabricated. Tables 1 to 3 show the structure of each of the phase-change optical disc and the evaluation results.

TABLE 1

|  | Example A | Comparative Example A1 | Comparative Example A2 | Comparative Example A3 |
|---|---|---|---|---|
| 1st interference film | $ZnS:SiO_2$ 50 nm | $ZnS:SiO_2$ 50 nm | $ZnS:SiO_2$ 50 nm | $ZnS:SiO_2$ 53 nm |
| Lower interface film | $HfO_2$ 3 nm | GeN 3 nm | SiN 3 nm | None |
| Recording film | $Ge_{40}Sb_8Te_{52}$ 13 nm | $Ge_{40}Sb_8Te_{52}$ 13 nm | $Ge_{40}Sb_8Te_{52}$ 13 nm | $Ge_{40}Sb_8Te_{52}$ 13 nm |
| Upper interface film | $HfO_2$ 3 nm | GeN 3 nm | SiN 3 nm | None |
| 2nd interference film | $ZnS:SiO_2$ 15 nm | $ZnS:SiO_2$ 15 nm | $ZnS:SiO_2$ 15 nm | $ZnS:SiO_2$ 18 nm |
| Reflective film | Ag alloy 150 nm | Ag alloy 150 nm | Ag alloy 150 nm | Ag alloy 150 nm |
| Rc | 19.2 | 18.6 | 18.4 | 19.3 |
| Ra | 2.4 | 2.2 | 2.1 | 2.3 |
| bER (G) | $1.40 * 10^{-5}$ | $4.80 * 10^{-4}$ | $9.20 * 10^{-3}$ | $>1 * 10^{-2}$ |
| bER (L) | $1.25 * 10^{-5}$ | $4.70 * 10^{-4}$ | $7.60 * 10^{-3}$ | $>1 * 10^{-2}$ |
| CNR (G) [dB] | 56.4 | 56.2 | 54.6 | 46.4 |
| CNR (L) [dB] | 56.2 | 55.8 | 53.8 | 45.8 |
| Erasure rate (G) [dB] | −33.2 | −30.2 | −21.4 | −2.4 |
| Erasure rate (L) [dB] | −34.2 | −31.2 | −18.5 | −1.5 |
| X-E (G) [dB] | −0.2 | −3.5 | −1.2 | 0 |
| X-E (L) [dB] | 0 | −0.7 | −0.3 | 0 |

TABLE 2

|  | Example B | Example C | Example D1 | Example D2 | Comparative Example D |
|---|---|---|---|---|---|
| 1st interference film | $ZnS:SiO_2$ 50 nm | None | $ZnS:SiO_2$ 50 nm | $ZnS:SiO_2$ 50 nm | $ZnS:SiO_2$ 50 nm |

TABLE 2-continued

| | Example B | Example C | Example D1 | Example D2 | Comparative Example D |
|---|---|---|---|---|---|
| Lower interface film | $HfO_2$—$CeO_2$ 3 nm | $HfO_2$—$ZrO_2$ 55 nm | $HfO_2$ 3 nm | $HfO_2$ 3 nm | GeN 3 nm |
| Recording film | $Ge_{40}Sb_8Te_{52}$ 13 nm | $Ge_{40}Sb_8Te_{52}$ 13 nm | $Ge_{31}Sb_{15}Te_{54}$ 13 nm | $Ge_{22}Sb_{22}Te_{56}$ 13 nm | $Ge_{22}Sb_{22}Te_{56}$ 20 nm |
| Upper interface film | $HfO_2$—$CeO_2$ 3 nm | $HfO_2$—$ZrO_2$ 20 nm | $HfO_2$ 3 nm | $HfO_2$ 3 nm | GeN 3 nm |
| 2nd interference film | $ZnS:SiO_2$ 15 nm | None | $ZnS:SiO_2$ 15 nm | $ZnS:SiO_2$ 15 nm | $ZnS:SiO_2$ 15 nm |
| Reflective film | Ag alloy 150 nm | Ag alloy 150 nm | Ag alloy 150 nm | Ag alloy 150 nm | Ag alloy 150 nm |
| Rc | 20.4 | 19.4 | 17.5 | 15.4 | 18.4 |
| Ra | 1.9 | 1.6 | 1.9 | 2 | 3.5 |
| bER (G) | $2.20 * 10^{-5}$ | $6.20 * 10^{-6}$ | $2.00 * 10^{-5}$ | $1.80 * 10^{-5}$ | $>1 * 10^{-2}$ |
| bER (L) | $1.80 * 10^{-5}$ | $4.20 * 10^{-6}$ | $2.20 * 10^{-5}$ | $2.10 * 10^{-5}$ | $>1 * 10^{-2}$ |
| CNR (G) [dB] | 55.5 | 56.8 | 54.2 | 53.4 | 51.6 |
| CNR (L) [dB] | 56.2 | 55.2 | 53.6 | 52.8 | 50.5 |
| Erasure rate (G) [dB] | −29.4 | −28.5 | −34.2 | −37.2 | −29.6 |
| Erasure rate (L) [dB] | −30.1 | −27.4 | −35.3 | −39.2 | −30.4 |
| X-E (G) [dE] | −0.3 | −0.4 | −0.5 | −0.8 | −6.8 |
| X-E (L) [dE] | 0 | 0 | 0 | −0.3 | −4.5 |

TABLE 3

| | Example E1 | Example E2 | Example F |
|---|---|---|---|
| 1st interference film | $ZnS:SiO_2$ 50 nm | $ZnS:SiO_2$ 50 nm | $ZnS:SiO_2$ 50 nm |
| Lower interface film | $HfO_2$ 3 nm | $HfO_2$ 3 nm | $HfO_2$ 3 nm |
| Recording film | $Ge_{40}Sb_4Bi_4Te_{52}$ 10 nm | $Ge_{23}Sn_8Sb_{15}Te_{54}$ 10 nm | $Ge_{40}Sb_8Te_{52}$ 20 nm |
| Upper interface film | $HfO_2$ 3 nm | $HfO_2$ 3 nm | $HfO_2$ 3 nm |
| 2nd interference film | $ZnS:SiO_2$ 15 nm | $ZnS:SiO_2$ 15 nm | $ZnS:SiO_2$ 15 nm |
| Reflective film | Ag alloy 150 nm | Ag alloy 150 nm | Ag alloy 150 nm |
| Rc | 19.1 | 18.2 | 21.5 |
| Ra | 2.2 | 2.1 | 2.2 |
| bER (G) | $2.40 * 10^{-5}$ | $1.70 * 10^{-5}$ | $3.20 * 10^{-5}$ |
| bER (L) | $1.20 * 10^{-5}$ | $9.00 * 10^{-6}$ | $2.50 * 10^{-5}$ |
| CNR (G) [dB] | 54.2 | 54.6 | 56.2 |
| CNR (L) [dB] | 53.8 | 53.2 | 56.3 |
| Erasure rate (G) [dB] | −31 | −32.2 | −31.6 |
| Erasure rate (L) [dB] | −30.5 | −31.2 | −30.2 |
| X-E (G) [dB] | 0 | −0.2 | −0.9 |
| X-E (L) [dB] | 0 | 0 | −0.3 |

Example A ($HfO_2$ Interface Film)

A phase-change optical disc (Example A) as shown in FIG. 3 was fabricated. The material used for each film and the thickness thereof were as follows:

| | |
|---|---|
| First interference film 11 | $ZnS:SiO_2$ (50 nm); |
| Lower interface film 12 | $HfO_2$ (3 nm); |
| Recording film 13 | $Ge_{40}Sb_8Te_{52}$ (13 nm); |
| Upper interface film 14 | $HfO_2$ (3 nm) |
| Second interference film 15 | $ZnS:SiO_2$ (15 nm); |
| Reflection film 16 | Ag alloy (150 nm). |

The disc of Example A exhibited a bit error rate (bER) lower than $2 \times 10^{-5}$ for each of the land and the groove, which was permissible level for a practical use. The excellent bER is also supported by the excellent analog characteristics including CNR higher than 56 dB, the erasure rate lower than −29 dB and the cross-erase of −0.2 dB or less. In other words, a satisfactory bER can be obtained because the CNR is excellent and the cross-erase is low in the case of using $HfO_2$ for the interface film.

Comparative Example A1 (GeN Interface Film) and Comparative Example A2 (Si—N Interface Film)

For comparison, phase-change optical discs having the stacked structure equal to that of Example A were fabricated, except that GeN and Si—N were used for the interface films in Comparative Examples A1 and A2, respectively.

The disc of each of Comparative Examples A1 and A2 was found to be inferior in the bER compared to Example A by 1 to 2 digits. To be more specific, the disc of Comparative Example A1, in which the interface film was formed of GeN, was found to be poor in the bER because the cross-erase was likely to be generated easily. The disc of Comparative Example A2, in which the interface film was formed of Si—N, was found to be poor in the bER because the CNR was low.

Incidentally, it is possible to improve either the CNR or the cross-erase to some extent by controlling the thickness of the interface film even in the case of using GeN or Si—N. However, it is impossible to improve simultaneously both the CNR and the cross-erase.

Comparative Example A3 (No Interface Film)

For comparison, a phase-change optical disc (Comparative Example A3) having a stacked structure in which the interface films are omitted from the disc of Example A was fabricated.

In the disc of Comparative A3, it was impossible to measure the bER. Also, in the disc of Comparative Example A3, the CNR value was also very small, which reflects the poor erasure rate in overwriting. It follows that, in the disc of Comparative Example A3, it was substantially impossible to achieve rewriting under the evaluating conditions employed.

Example B (Change in Composition of Interface Film)

A phase-change optical disc (Example B) having the stacked structure equal to that of Example A was fabricated, except that $HfO_2$—$CeO_2$ (the molar ratio of 60:40) was used for the interface films in place of $HfO_2$.

The disc of Example B was somewhat inferior to the disc of Example A in respect of the cross-erase X-E, but was superior to the disc of Example A in each of the CNR and the erasure rate.

Example C (Omission of Interference Film)

A phase-change optical disc (Example C) in which the interference films were omitted as shown in FIG. 5 and $HfO_2$—$ZrO_2$ (the molar ratio of 40:60) is used for the interface films was fabricated. Incidentally, in accordance with omission of the interference films, the thickness of the lower interface film 12 on the light incident side was set at 55 nm, and the thickness of the upper interface film 14 on the side of the reflection film was set at 20 nm.

The disc of Example C was found to be excellent in each of the cross-erase X-E, the CNR, and the erasure rate. Also, since the total number of the films in the disc of Example C was smaller by two than that for Example A, it was possible to decrease the deposition processes, which brings about superior productivity.

Where the interference films, which were widely used in the prior art, are omitted and the interface films alone specified in the present invention are formed in place of the interference films, it is desirable to pay sufficient attentions to the combination of the thickness and the heat conductivity of the interface film. To be more specific, if the interface film has excessively high heat conductivity, it is difficult to heat the recording film to reach the melting point thereof. On the other hand, if the heat conductivity of the interface film is excessively low, recrystallization in the melted region of the recording film is rendered prominent, with the result that decrease in CNR and generation of cross-erase are promoted.

In the disc of Example C, $HfO_2$—$ZrO_2$ was used for the interface films, and the interface films formed on the light incident side and on the side of the reflection film relative to the recording film were made somewhat thicker so as to lead to the satisfactory results.

Also, it is desirable to mix other elements and compounds containing other elements for controlling the heat conductivity. For example, it is possible to use a mixture of $HfO_2$ and $ZnS:SiO_2$ for the interface film.

Incidentally, in Example C, the interference films on the light incident side and on the side of the reflection film relative to the recording film are omitted. However, it is also possible to omit the interference film on the light incident side alone relative to the recording film as shown in FIG. 4. Also, it is possible to omit only the interference film on the side of the reflection film relative to the recording film.

Examples D1, D2 and Comparative Example D (Influences Given by Composition of Recording Film)

A phase-change optical disc (Example D1) having the stacked structure equal to that of Example A was fabricated, except that the composition of the recording film was changed to $Ge_{31}Sb_{15}Te_{54}$ (Ge:Sb:Te=4:2:7), lower in the Ge content than that for Example A.

The disc of Example D1 was somewhat superior to the disc of Example A in the erasure rate, but was inferior in the CNR and the cross-erase X-E. However, a high cross-erase X-E as in Comparative Example A1 and a low erasure rate as in Comparative Example A2 were not observed in the disc of Example D1, supporting that the evaluation results for Example D1 were free from a practical problem. Therefore, it is believed that the effects due to the use of the $HfO_2$ interface film can be produced even in the case of changing the composition of the recording film.

Also, a phase-change optical disc (Example D2) having the stacked structure equal to that of Example A was fabricated, except that the composition of the recording film was changed to $Ge_{22}Sb_{22}Te_{56}$. It should be noted that the Ge content in the recording film for Example D2 is much lower than that in the recording film for Example D1.

The disc of Example D2 exhibited a particularly excellent value in respect of the erasure rate, but was interior to the disc of Example D1 in each of the CNR and the cross-erase X-E. However, a high cross-erase X-E as in Comparative Example A1 and a low erasure rate as in Comparative Example A2 were not observed in the disc of Example D2, supporting that the evaluation results for Example D2 were free from a practical problem.

The reason why the disc of Example D2 is inferior to Example D1 in the CNR is that change in the optical characteristics (complex refractive indices n and k) between a crystalline phase and an amorphous phase is decreased with decrease in the Ge content of the recording film.

In order to confirm the particular situation, a phase-change optical disc (Comparative Example D) having the stacked structure equal to that of Example D2 was fabricated, except that the interface film was changed to the conventional interface film made of GeN.

In the disc of Comparative Example D, the CNR was further degraded to about 51 dB, compared with the disc of Example D2. Also, in the disc of Comparative Example D, the cross-erase X-E to the groove was high, i.e., −6.8 dB, and the cross-erase X-E to the land was much higher, i.e., −4.5 dB.

Such being the situation, it has been confirmed that, in the case of using $HfO_2$ for the interface films, the CNR can be increased and the cross-erase X-E can be lowered, compared with the case of using the conventional interface film, even if the recording film is formed of GeSbTe having a low Ge content.

As described above, the interface film specified in the present invention permits prominent effects when used in combination with a GeSbTe recording film having a low Ge content, compared with the conventional interface film, and also permits a further prominent effects when used in combination with a GeSbTe recording film having a higher Ge content.

Examples E1 and E2 (Influences Produced by Composition of Recording Film, Substitution of Bi and Sn)

A phase-change optical disc (Example E1) having the stacked structure equal to that of Example A was fabricated, except that Bi was substituted partly for Sb contained in the material of the recording film such that the composition of the recording film was changed to $Ge_{40}Sb_4Bi_4Te_{52}$ (Ge:Sb:Bi:Te=10:1:1:13).

The disc of Example E1 was somewhat inferior in the CNR to the disc of Comparative Example A1, but it was substantially free from the practical problem in the CNR value. The disc of Example E1 was superior in the erasure rate to the disc of Comparative Example A1, and thus it was free from the practical problem in the erasure rate. Also, the decrease in the signal level was not recognized at all in the disc of Example E1 even if the overwriting was performed 10 times on the adjacent tracks, with the result that the cross-erase X-E was particularly low. Such being the situation, the CNR after recording of signals on the adjacent tracks was found to be larger than the CNR after recording similarly performed on the adjacent tracks in Example A1. Therefore, it is found that prominent effects can also be produced in the case where the $HfO_2$ interface film is used in combination with the GeSbBiTe recording film.

A phase-change optical disc (Example E2) having the stacked structure equal to that of Example D2 was fabricated, except that Sn was substituted partly for Ge contained in the material of the recording film such that the composition of the recording film was changed to $Ge_{23}Sn_8Sb_{15}Te_{54}$ (Ge:Sn:Sb:Te=3:1:2:7).

The disc of Example E2 was somewhat inferior in the CNR to the disc of Comparative Example A1 but substantially equal to the disc of Comparative Example A2, which was substantially free from the practical problem in the CNR. The disc of Example E2 was superior in the erasure rate to the disc of Comparative Example A1, and thus it was free from the practical problem in the erasure rate. Also, the disc of Example E2 was particularly low in the cross-erase X-E. Such being the situation, the CNR after recording of signals on the adjacent tracks was found to be larger than that in Example A1. Therefore, it is found that prominent effects can also be produced in the case where the $HfO_2$ interface film is used in combination with the GeSnSbTe recording film.

Example F (Influence Given by Thickness of Recording Film)

A phase-change optical disc (Example F) having the stacked structure equal to that of Example A was fabricated, except that the thickness of the recording film was set at 20 nm.

The disc of Example F was superior in the overall characteristics to disc of each of Comparative Examples A1 and A2. On the other hand, the disc of Example F was substantially compared with the disc of Example A in the CNR and the erasure rate, but it was inferior to the disc of Example A in the cross-erase X-E. Therefore, it is desirable that the thickness of the recording film be smaller than 20 nm.

Examples G, H and Comparative Example:

Phase-change optical discs each having Low-to-High polarity, in which the reflectance Ra of the amorphous portion is higher than the reflectance Rc of the crystalline portion, were fabricated. Table 4 shows the structure of each of the phase-change optical discs and the evaluation results.

TABLE 4

|  | Example G | Comparative Example G | Example H |
|---|---|---|---|
| 1st interference film | $ZnS:SiO_2$ 30 nm | $ZnS:SiO_2$ 30 nm | $ZnS:SiO_2$ 30 nm |
|  | $SiO_2$ 90 nm | $SiO_2$ 90 nm | $SiO_2$ 90 nm |
|  | $ZnS:SiO_2$ 20 nm | $ZnS:SiO_2$ 20 nm | — |
| Lower interface film | $HfO_2$—$ZrO_2$ 3 nm | GeN 3 nm | $HfO_2$—$ZrO_2$ 25 nm |
| Recording film | $Ge_{40}Sb_8Te_{52}$ 13 nm | $Ge_{40}Sb_8Te_{52}$ 13 nm | $Ge_{40}Sb_8Te_{52}$ 13 nm |
| Upper interface film | $HfO_2$—$ZrO_2$ 3 nm | GeN 3 nm | $HfO_2$—$ZrO_2$ 23 nm |
| 2nd interference film | $ZnS:SiO_2$ 20 nm | $ZnS:SiO_2$ 20 nm | None |
| Reflective film | Ag alloy 150 nm | Ag alloy 150 nm | Ag alloy 150 nm |
| Rc | 5.5 | 5.2 | 5.8 |
| Ra | 27.3 | 27.5 | 28.5 |
| bER (G) | $7.2 * 10^{-6}$ | $4.5 * 10^{-5}$ | $5.8 * 10^{-6}$ |
| bER (L) | $5.6 * 10^{-6}$ | $8.2 * 10^{-5}$ | $6.2 * 10^{-6}$ |
| CNR (G) [dB] | 58.9 | 54.3 | 58.2 |
| CNR (L) [dB] | 58.2 | 55.2 | 58.4 |
| Erasure rate (G) [dB] | −33.3 | −32.1 | −33.8 |
| Erasure rate (L) [dB] | −32.7 | −31.8 | −33.1 |
| X-E (G) [dB] | −0.4 | −4.2 | −0.3 |
| X-E (L) [dB] | −0.1 | −1.5 | 0 |

Example G (Low-to-High Disc Using Interference Film of Three-Layer Structure)

A phase-change optical disc (Example G) having Low-to-High polarity was fabricated. The material used for each of the films and the thickness of each film were as follows:

| First interference film 11 | $ZnS:SiO_2$ (30 nm)/$SiO_2$ (90 nm)/$ZnS:SiO_2$ (20 nm); |
|---|---|

| | |
|---|---|
| Lower interface film 12 | HfO$_2$—ZrO$_2$ (3 nm); |
| Recording film 13 | Ge$_{40}$Sb$_8$Te$_{52}$ (13 m); |
| Upper interface film 14 | HfO$_2$ (3 nm); |
| Second interference film 15 | ZnS:SiO$_2$ (20 nm); |
| Reflection film 16 | Ag alloy (150 nm). |

In this disc, it was possible to achieve a large modulation degree such that the reflectance Ra of the amorphous portion was 27.3% and the reflectance Rc of the crystalline portion was 5.5%. Also, the disc was particularly excellent in the CNR and exhibited a very low in the bER because it was excellent in the erasure rate and the cross-erase X-E.

Comparative Example G (GeN Interface Film)

For comparison, a phase-change optical disc (Comparative Example G) having the stacked structure equal to that of Example G was fabricated, except that GeN was used for the interface films.

The disc of Comparative Example G was excellent in the reflectance difference like the disc of Example G, but it was inferior in the CNR. This is because the region that was once melted in the write stage was not entirely rendered amorphous and was partly recrystallized so that the poor CNR was brought about. In this connection, the disc of Comparative Example G was also inferior in the bER compared to the disc of Example G.

Example H (Omission of Interference Films):

A phase-change optical disc (Example H) having the stacked structure equal to the disc of Example G was fabricated, except that ZnS:SiO$_2$ positioned close to the recording film 13 of the first interference film 11 and the second interference film 15 were omitted. Incidentally, in accordance with omission of the interference films, the thickness of the lower interface film 12 on the light incident side was set at 25 nm, and the thickness of the upper interface film 14 on the side of the reflection film was set at 23 nm.

The disc of Example H was found to be high in each of the CNR value and the erasure rate. In addition, the disc was excellent in productivity.

Examples L to U and Comparative Examples:

Dual-layer single-sided phase-change optical discs as shown in FIG. 8 were prepared. A 0.6 mm-thick polycarbonate substrate, formed by injection molding, was used as the substrate. Grooves were formed on the polycarbonate substrate with a groove pitch of 0.74 µm. Therefore, in the case of land and groove recording, the track pitch comes to 0.37 µm. Various films were successively deposited using a sputtering apparatus on that surface of the polycarbonate substrate on which the grooves were formed so as to form a first information layer (semi-transparent information layer). On the other hand, a stacked structure of Ag alloy/ZnS:SiO$_2$/GeSbTe recording film/ZnS:SiO$_2$ was formed by sputtering on the surface of another 0.6 mm-thick polycarbonate substrate so as to prepare a second information layer. The recording film of the second information layer was entirely subjected to initial crystallization using an initializing apparatus. The substrates were arranged in a manner that the first and second information layers face each other and were bonded with a UV curable resin layer. The dual-layer single-sided phase-change optical disc thus prepared was set in an initializing apparatus, and the recording film of the first information layer was entirely subjected to initial crystallization. Then, recording experiments were carried out using the same evaluating apparatus as described above, in which the pick-up head of the evaluation apparatus was focused on the first information layer to carry out land and groove recording. The bit error rate bER, the carrier-to-noise ratio CNR, the DC erasure rate, and the cross-erase (X-E) were evaluated in the same manner as described above. Any of these measurements was applied to the tracks on the groove (G) and the land (L).

Example L

On the first substrate, ZnS:SiO$_2$ (the first interference film)/HfO$_2$ (the lower interface film)/GeSbTe (the recording film)/HfO$_2$(the upper interface film)/SiO$_2$ (the second interference film)/Ag alloy (the semi-transparent reflection film)/SiO$_2$ (the heat sink film) were successively deposited in the order mentioned so as to form a first information layer (semi-transparent information layer). The thickness of each of the films is shown in Table 5.

The recording film was formed using a target having a composition of Ge$_{40}$Sb$_8$Te$_{52}$ (Ge:Sb:Te=10:2:13). The first interference film of ZnS:SiO$_2$ was formed using a target containing 80 at. % of ZnS and 20 at. % of SiO$_2$.

The refractive index of the UV curable resin was about 1.5 and the refractive index of SiO$_2$ heat sink film was about 1.5 for recording light having a wavelength of 405 nm. Also, the heat conductivity of the HfO$_2$ interface film was 1.8 W/mK and the heat conductivity of the SiO$_2$ heat sink film was 1.3 W/mK.

Table 5 shows the measurement results in respect of the disc thus fabricated. The bit error rate (bER) was not higher than $6 \times 10^{-5}$ for each of the land and the groove, and thus there was no practical problem. It is considered that the excellent bER can be obtained because the disc exhibited excellent characteristics in the analog measurements such that the CNR was not lower than 52 dB for each of the land and the groove, the erasure rate was not higher than −25 dB, and the cross-erase was not higher than −0.2 dB. This clearly exhibits the feature that there is no trade-off between CNR and cross-erase (X-E) when HfO$_2$ is used for the interface film.

Incidentally, it is desirable for each film to have a thickness falling within the range described below. The first interference film such as ZnS:SiO$_2$ on the light incident side should preferably have a thickness from 30 nm to 160 nm and a range within which desired reflectance is satisfied. The interface films should preferably have a thickness of 5 nm or less. The recording film should preferably have a thickness falling within a range of between 5 nm and 8 nm. The second interference film positioned close to the reflection film should preferably have a thickness falling within a range of between 5 nm and 30 nm. The reflection film should preferably have a thickness falling with a range of between 5 nm and 10 nm. The heat sink film should preferably have a thickness falling within a range of between 10 nm and 100 nm.

Examples M1 and M2 (Change in Composition of Recording Film)

A phase-change optical disc (Example M1) having the stacked structure equal to that of Example L was fabricated, except that the composition of the recording film was changed to $Ge_{40}Sb_4Te_{52}Bi_4$ (Ge:Sb:Te:Bi=10:1:13:1). Table 5 shows the evaluation results. The disc of Example M1 was superior in each of CNR, erasure rate and X-E compared to those of Example L.

Similarly, a phase-change optical disc (Example M2) having the stacked structure equal to that of Example L was fabricated, except that the composition of the recording film was changed to $Ge_{23}Sb_{15}Te_{54}Sn_8$ (Ge:Sb:Te:Sn=3:2:7:1, the sum of Ge and Sn being 31 at. %). Table 5 shows the evaluation results. The disc of Example M2 was somewhat inferior in CNR compared to the disc of Example L, though the CNR value did not bring about a practical problem. Also, the disc of Example M2 was superior in each of the erasure rate and X-E compared to the disc of Example L.

Example N (Change in Materials of Second Interference Film and Heat Sink Film)

The material of the second interference film was changed to $ZnS:SiO_2$ and the material of the heat sink film was changed to $Al_2O_3$ with respect to the disc of Example M1. Thus, a phase-change optical disc (Example N) of the following structure was fabricated: $ZnS:SiO_2/HfO_2/GeSbTeBi/HfO_2/ZnS:SiO_2/Ag$ alloy/$Al_2O_3$. The refractive index of $Al_2O_3$ used for the heat sink film is about 1.7. Table 5 shows the evaluation results. The disc of Example N was superior in each of CNR and erasure rate compared to those of Example M1. Also, the disc of Example N exhibited a low X-E level that gives rise to no practical problem. Further, the disc of Example N exhibited the most excellent transmittance.

Comparative Examples L1 and L2 (Change in Material of Interface Film to GeN and Cr—O)

A disc similar to that of Example N was fabricated in which the material of the interface film was changed to GeN (Comparative Example L1), and another disc similar to that of Example N was fabricated in which the material of the interface film was changed to Cr—O (Comparative Example L2). Table 6 shows the evaluation results. The disc of each of Comparative Examples L1 and L2 was markedly inferior in bER compared to the disc of Example N. Judging from the results of the analog measurements, the reason why the poor bER was resulted in Example L1 or L2 is ascribed to the poor X-E value in the case of the GeN interface film, and to the poor CNR value in the case of the Cr—O interface film.

Incidentally, it is possible to improve either the CNR or the X-E to some extent by controlling the thickness of the interface film even in the case of using GeN or Si—N. However, it is impossible to improve both the CNR and the X-E simultaneously.

Comparative Example M (No Interface Film)

A disc (Comparative Example M) having the structure of $ZnS:SiO_2/GeSbTeBi/ZnS:SiO_2/Ag$ alloy/$Al_2O_3$ was fabricated, in which the interface films were omitted from the disc of Example N. Table 6 shows the evaluation results. In the optical disc of Comparative Example M, it was impossible to measure bER. Also, the disc of Comparative Example M was very poor in CNR, which reflected the poor erasure rate in overwriting. As a result, the disc of Comparative Example M was substantially incapable of performing rewrite under the evaluating conditions.

TABLE 6

|  | Comparative Example L1 | Comparative Example L2 | Comparative Example M |
|---|---|---|---|
| 1st interference film | $ZnS:SiO_2$ 50 nm | $ZnS:SiO_2$ 50 nm | $ZnS:SiO_2$ 50 nm |
| Lower interface film | GeN 1 nm | Cr—O 2 nm | None |
| Recording film | GeSbTeBi 6 nm | GeSbTeBi 6 nm | GeSbTeBi 6 nm |
| Upper interface film | GeN 1 nm | Cr—O 2 nm | None |

TABLE 5

|  | Example L | Example M1 | Example M2 | Example N |
|---|---|---|---|---|
| 1st interference film | $ZnS:SiO_2$ 50 nm | $ZnS:SiO_2$ 50 nm | $ZnS:SiO_2$ 50 nm | $ZnS:SiO_2$ 50 nm |
| Lower interface film | $HfO_2$ 1 nm | $HfO_2$ 1 nm | $HfO_2$ 1 nm | $HfO_2$ 1 nm |
| Recording film | GeSbTe 6 nm | GeSbTeBi 6 nm | GeSbTeSn 6 nm | GeSbTeBi 6 nm |
| Upper interface film | $HfO_2$ 1 nm | $HfO_2$ 1 nm | $HfO_2$ 1 nm | $HfO_2$ 1 nm |
| 2nd interference film | $SiO_2$ 14 nm | $SiO_2$ 14 nm | $SiO_2$ 14 nm | $ZnS:SiO_2$ 20 nm |
| Semi-transparent reflecting film | Ag alloy 6 nm | Ag alloy 6 nm | Ag alloy 6 nm | Ag alloy 6 nm |
| Heat sink film | $SiO_2$ 30 nm | $SiO_2$ 30 nm | $SiO_2$ 30 nm | $Al_2O_3$ 30 nm |
| Rc | 13 | 13.7 | 10.5 | 5.9 |
| Ra | 5.1 | 5.5 | 5 | 1.4 |
| Average transmittance | 45 | 46 | 47 | 50 |
| bER (G) | $4.0 * 10^{-5}$ | $9.8 * 10^{-6}$ | $4.5 * 10^{-5}$ | $5.1 * 10^{-6}$ |
| bER (L) | $5.5 * 10^{-5}$ | $2.3 * 10^{-5}$ | $3.0 * 10^{-5}$ | $2.1 * 10^{-5}$ |
| CNR (G) | 53 | 55.2 | 51.7 | 56.0 |
| CNR (L) | 52.3 | 54.1 | 52.6 | 54.1 |
| Erasure rate (G) | −26.5 | −29.7 | −29.6 | −31.9 |
| Erasure rate (L) | −27 | −28.2 | −30.9 | −31.5 |
| X-E (G) | −0.2 | −0.1 | −0.3 | −0.3 |
| X-E (L) | −0.4 | 0 | 0 | 0 |

TABLE 6-continued

|  | Comparative Example L1 | Comparative Example L2 | Comparative Example M |
|---|---|---|---|
| 2nd interference film | ZnS:SiO$_2$ 20 nm | ZnS:SiO$_2$ 20 nm | ZnS:SiO$_2$ 20 nm |
| Semi-transparent reflecting film | Ag alloy 6 nm | Ag alloy 6 nm | Ag alloy 6 nm |
| Heat sink film | Al$_2$O$_3$ 30 nm | Al$_2$O$_3$ 30 nm | Al$_2$O$_3$ 30 nm |
| Rc | 5.4 | 5.4 | 6.2 |
| Ra | 1.4 | 1.1 | 1.1 |
| Average transmittance | 49 | 50 | 50 |
| bER (G) | $1.5 * 10^{-5}$ | $2.2 * 10^{-3}$ | Unmeasured |
| bER (L) | $3.1 * 10^{-4}$ | $3.1 * 10^{-3}$ | Unmeasured |
| CNR (G) | 52.8 | 44.3 | 37.5 |
| CNR (L) | 52.1 | 41.9 | 36.5 |
| Erasure rate (G) | −28.4 | −24.4 | −20.1 |
| Erasure rate (L) | −26.5 | −22.5 | −21.9 |
| X-E (G) | −3.7 | −0.3 | −0.1 |
| X-E (L) | −1.5 | 0 | 0 | of Example O2 was inferior in the average transmittance compared to Example N, with the result that it was difficult to write and read data in and out of the second information layer. Thus, it has been found that it is desirable for the recording film to have a thickness falling within a range of between 5 nm and 8 nm.

Examples P1 and P2 (Dependency on Thickness of Reflection Film)

Phase-change optical discs differing from that of Example N in the thickness of the reflection film were fabricated. In the disc of Example P1, the thickness of the reflection film was decreased to 5 nm. In the disc of Example P2, the thickness of the reflection film was increased to 10 nm. Table 7 shows the evaluation results. The disc of Example P1 was inferior in CNR compared to Example N because the cooling effect of the reflection film was weakened. The disc of Example P2 was excellent in each of CNR and erasure rate. However, the disc of Example P2 was inferior in the average transmittance compared to the disc of Example N, with the result that it was difficult to write and read data in and out of the second information layer. Thus, it has been found that it is desirable for the reflection film to have a thickness falling within a range of between 5 nm and 10 nm.

TABLE 7

|  | Example O1 | Example O2 | Example P1 | Example P2 |
|---|---|---|---|---|
| 1st interference film | ZnS:SiO$_2$ 50 nm | ZnS:SiO$_2$ 50 nm | ZnS:SiO$_2$ 50 nm | ZnS:SiO$_2$ 50 nm |
| Lower interface film | HfO$_2$ 1 nm | HfO$_2$ 1 nm | HfO$_2$ 1 nm | HfO$_2$ 1 nm |
| Recording film | GeSbTeBi 5 nm | GeSbTeBi 8 nm | GeSbTeBi 6 nm | GeSbTeBi 6 nm |
| Upper interface film | HfO$_2$ 1 nm | HfO$_2$ 1 nm | HfO$_2$ 1 nm | HfO$_2$ 1 nm |
| 2nd interference film | ZnS:SiO$_2$ 20 nm | ZnS:SiO$_2$ 20 nm | ZnS:SiO$_2$ 20 nm | ZnS:SiO$_2$ 20 nm |
| Semi-transparent reflecting film | Ag alloy 6 nm | Ag alloy 6 nm | Ag alloy 5 nm | Ag alloy 10 nm |
| Heat sink film | Al$_2$O$_3$ 30 nm | Al$_2$O$_3$ 30 nm | Al$_2$O$_3$ 30 nm | Al$_2$O$_3$ 30 nm |
| Rc | 5.5 | 7.9 | 4.9 | 8.2 |
| Ra | 2.4 | 0.8 | 1.1 | 2.1 |
| Average transmittance | 52 | 42 | 52 | 41 |
| bER (G) | $1.3 * 10^{-4}$ | $6.3 * 10^{-6}$ | $1.9 * 10^{-4}$ | $9.6 * 10^{-6}$ |
| bER (L) | $1.1 * 10^{-4}$ | $7.8 * 10^{-6}$ | $3.2 * 10^{-4}$ | $5.2 * 10^{-6}$ |
| CNR (G) | 50.3 | 56.7 | 51.3 | 56.3 |
| CNR (L) | 51.2 | 55.8 | 50.3 | 57.2 |
| Erasure rate (G) | −28.1 | −33.2 | −27.6 | −27.8 |
| Erasure rate (L) | −25.5 | −35.1 | −26.3 | −29.1 |
| X-E (G) | 0 | −0.7 | 0 | −0.2 |
| X-E (L) | 0 | −0.4 | 0 | −0.3 |

Examples O1, O2 (Dependency on Thickness of Recording Film)

Phase-change optical recording discs differing from that of Example N in the thickness of the recording film were fabricated. In the disc of Example O1, the thickness of the recording film was decreased to 5 nm. In the disc of Example O2, the thickness of the recording film was increased to 8 nm. Table 7 shows the evaluation results. In the disc of Example O1, the reflectance difference between the crystalline phase and the amorphous phase was not sufficiently large, with the result that the disc was inferior in CNR compared to Example N. The disc of Example O2 was excellent in each of CNR and erasure rate. However, the disc Example Q (Combination of HfO$_2$ Interface Film and SiO$_2$ Heat Sink Film)

A phase-change optical disc (Example Q) having the structure of ZnS:SiO$_2$/HfO$_2$/GeSbTeBi/HfO$_2$/ZnS:SiO$_2$/Ag alloy/SiO$_2$ was fabricated. The composition of GeSbTeBi was equal to that for the disc of Example M1. Table 8 shows the evaluation results. The characteristics of the disc of Example Q including CNR, erasure rate and X-E were found to be on the levels free from the practical problem.

Example R (Combination of CeO$_2$ Interface Film and Al$_2$O$_3$ Heat Sink Film)

A phase-change optical disc (Example R) was fabricated using CeO$_2$ for the interface film and Al$_2$O$_3$ for the heat sink film, the disc having the structure of ZnS:SiO$_2$/CeO$_2$/GeSbTeBi/CeO$_2$/SiO$_2$/Ag alloy/Al$_2$O$_3$. The composition of GeSbTeBi was equal to that for the disc of Example M1. The heat conductivity of CeO$_2$ is 15 W/mK and the heat conductivity of Al$_2$O$_3$ is 30 W/mK. Table 8 shows the evaluation results. Since the heat conductivity of the Al$_2$O$_3$ heat sink film is higher than that of the CeO$_2$ interface film, the disc of Example R exhibits a high CNR and a high erasure rate so as to attain low cross-erase.

Example S (Disc Having Interface Film on One Surface of Recording Film)

A phase-change optical disc (Example S) having the structure of ZnS:SiO$_2$/GeSbTeBi/CeO$_2$/ZnS:SiO$_2$/Ag alloy/Al$_2$O$_3$ was fabricated, in which the lower interface film was not formed. The composition of GeSbTeBi was equal to that for the disc of Example M1. Table 8 shows the evaluation results. The disc of Example S was high in each of CNR and erasure rate and low in cross-erase.

Example T (Omission of Second Interference Film):

A phase-change optical disc (Example T) having the structure of ZnS:SiO$_2$/GeSbTeBi/HfO$_2$/Ag alloy/Al$_2$O$_3$ was fabricated, in which the lower interface film was omitted and an upper interface film was substituted for the second interference film. The composition of GeSbTeBi was equal to that for the disc of Example M1. Table 8 shows the evaluation results. The disc of Example T was high in each of CNR and erasure rate and low in cross-erase.

Comparative Example O (Heat Sink Film Having Excessively High Heat Conductivity)

A disc (Comparative Example O) having the structure of ZnS:SiO$_2$/HfO$_2$/GeSbTeBi/HfO$_2$/SiO$_2$/Ag alloy/AlN was fabricated, in which the material of the heat sink film in the disc of Example M1 was changed to AlN. Table 9 shows the evaluation results. The disc of Comparative Example O was incapable of obtaining a sufficient CNR even under the condition of write power of 11 mW that was the maximum for the laser mounted to the evaluating apparatus. This is because excessively high heat conductivity (270 W/mK) of AlN brings about degraded recording sensitivity.

Example U (Change in Composition of Interface Film)

A phase-change optical disc (Example U) having a stacked structure as shown in Table 9 was fabricated. In this case, HfO$_2$—SiO$_2$ having a molar ratio of 60:40 was used in place of HfO$_2$ for the interface film. Table 9 shows the evaluation results.

Comparative Example P (Change in Composition of Interface Film)

A phase-change optical disc (Comparative Example P) having a stacked structure as shown in Table 9 was fabricated. In this case, HfO$_2$—SiO$_2$ having a molar ratio of 40:60 was used in place of HfO$_2$ for the interface film. Table 9 shows the evaluation results.

TABLE 8

|  | Example Q | Example R | Example S | Example T |
|---|---|---|---|---|
| 1st interference film | ZnS:SiO$_2$ 50 nm | ZnS:SiO$_2$ 50 nm | ZnS:SiO$_2$ 50 nm | ZnS:SiO$_2$ 40 nm |
| Lower interface film | HfO$_2$ 1 nm | CeO$_2$ 3 nm | None | None |
| Recording film | GeSbTeBi 6 nm | GeSbTeBi 6 nm | GeSbTeBi 6 nm | GeSbTeBi 6 nm |
| Upper interface film | HfO$_2$ 1 nm | CeO$_2$ 3 nm | CeO$_2$ 3 nm | HfO$_2$ 10 nm |
| 2nd interference film | ZnS:SiO$_2$ 20 nm | SiO$_2$ 14 nm | ZnS:SiO$_2$ 18 nm | None |
| Semi-transparent reflecting film | Ag alloy 6 nm | Ag alloy 6 nm | Ag alloy 6 nm | Ag alloy 8 nm |
| Heat sink film | SiO$_2$ 30 nm | Al$_2$O$_3$ 30 nm | Al$_2$O$_3$ 30 nm | Al$_2$O$_3$ 30 nm |
| Rc | 6.1 | 13.2 | 6.7 | 6.1 |
| Ra | 1.2 | 4.6 | 1.3 | 1.1 |
| Average transmittance | 50 | 46 | 49 | 50 |
| bER (G) | $1.3 * 10^{-5}$ | $7.3 * 10^{-5}$ | $9.5 * 10^{-6}$ | $8.8 * 10^{-5}$ |
| bER (L) | $7.3 * 10^{-5}$ | $7.8 * 10^{-5}$ | $1.0 * 10^{-5}$ | $1.8 * 10^{-4}$ |
| CNR (G) | 54.0 | 52.3 | 55.6 | 53.2 |
| CNR (L) | 52.0 | 52.1 | 54.4 | 51.5 |
| Erasure rate (G) | −33.4 | −33.1 | −28.7 | −30.1 |
| Erasure rate (L) | −32.0 | −31.6 | −27.7 | −29.8 |
| X-E (G) | −0.1 | −0.4 | 0 | 0.1 |
| X-E (L) | −0.2 | 0 | 0 | 0.3 |

Comparative Example N (Heat Sink Film Having Low Heat Conductivity):

A disc (Comparative Example N) having the structure of ZnS:SiO$_2$/CeO$_2$/GeSbTeBi/CeO$_2$/SiO$_2$/Ag alloy/SiO$_2$, in which the material of the heat sink film in the disc of Example R was changed to SiO$_2$. Table 9 shows the evaluation results. The disc of Comparative Example N shows high cross-erase. The reason of the high cross-erase is attributed to the fact that the heat conductivity (1.3 W/mK) of the SiO$_2$ heat sink film is markedly lower than the heat conductivity (15 W/mK) of the CeO$_2$ interface film.

It has been found that, even in the case of using an interface film formed of (HfO$_2$)$_{60}$(SiO$_2$)$_{40}$ as in Example U, the bER in the order of $10^{-5}$ is maintained and the erasure rate is sufficiently high, although these values are inferior than those for Example L. On the other hand, in the case of using an interface film formed of (HfO$_2$)$_{40}$(SiO$_2$)$_{60}$ as in Comparative Example P, bER cannot be measured and also CNR is very poor. It can be judged from these results that, in the case where an additive material (for example, SiO$_2$) other than HfO$_2$, CeO$_2$, TiO$_2$ and ZrO$_2$ is added to the interface film, the amount of the additive material should preferably be set to 50% or less.

TABLE 9

| | Comparative Example N | Comparative Example O | Example U | Comparative Example P |
|---|---|---|---|---|
| 1st interference film | ZnS:SiO$_2$ 50 nm | ZnS:SiO$_2$ 50 nm | ZnS:SiO$_2$ 50 nm | ZnS:SiO$_2$ 50 nm |
| Lower interface film | CeO$_2$ 3 nm | HfO$_2$ 3 nm | (HfO$_2$)$_{60}$(SiO$_2$)$_{40}$ 1 nm | (HfO$_2$)$_{40}$(SiO$_2$)$_{60}$ 1 nm |
| Recording film | GeSbTeBi 6 nm | GeSbTeBi 6 nm | GeSbTeBi 6 nm | GeSbTeBi 6 nm |
| Upper interface film | CeO$_2$ 3 nm | HfO$_2$ 3 nm | (HfO$_2$)$_{60}$(SiO$_2$)$_{40}$ 1 nm | (HfO$_2$)$_{40}$(SiO$_2$)$_{60}$ 1 nm |
| 2nd interference film | SiO$_2$ 14 nm | SiO$_2$ 14 nm | SiO$_2$ 14 nm | SiO$_2$ 14 nm |
| Semi-transparent reflecting film | Ag alloy 6 nm | Ag alloy 6 nm | Ag alloy 6 nm | Ag alloy 6 nm |
| Heat sink film | SiO$_2$ 30 nm | AlN 30 nm | SiO$_2$ 30 nm | SiO$_2$ 30 nm |
| Rc | 13.2 | 15.6 | 12.8 | 12.2 |
| Ra | 5 | 4.9 | 4.8 | 4.4 |
| Average transmittance | 46 | 45 | 46 | 45 |
| bER (G) | 1.6 * 10$^{-4}$ | Unmeasured | 9.5 * 10$^{-5}$ | Unmeasured |
| bER (L) | 1.4 * 10$^{-4}$ | Unmeasured | 8.9 * 10$^{-5}$ | Unmeasured |
| CNR (G) | 52.9 | 30.4 | 52.2 | 38.2 |
| CNR (L) | 51.2 | 28.3 | 52.4 | 35.5 |
| Erasure rate (G) | −32.4 | −15.5 | −24.3 | −18.5 |
| Erasure rate (L) | −30 | −14.1 | −25.7 | −16.2 |
| X-E (G) | −3 | 0 | −0.2 | 0 |
| X-E (L) | 0 | 0 | −0.1 | 0 |

As described above, the material of the interface film in contact with the recording film according to the present invention brings about the effect of improving the crystallization speed. In the case where the crystallization speed is excessively high, for example, the interface film may contain a compound such as an oxide other than hafnium oxide, cerium oxide, titanium oxide and zirconium oxide, a nitride, a carbide and a sulfide, or another element. In particular, the interface film greatly affects not only the crystallization speed but also temperature hysteresis of the recording film. It follows that it is desirable to add another compound or element to the interface film for controlling the heat conductivity. The particular case is not deviated from the subject matter of the present invention.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A phase-change optical recording medium, comprising:
a transparent substrate;
a first interference film formed on the transparent substrate;
a lower interface film formed on the first interference film;
a phase-change optical recording film that permits reversible phase change between a crystalline phase and an amorphous phase upon irradiation with light formed on the lower interface film;
an upper interface film formed on the phase-change optical recording film;
a second interference film formed on the upper interface film; and
a reflection film formed on the second interference film,
wherein the lower and upper interface films are formed of hafnium oxide, or a mixture of hafnium oxide and at least one oxide selected from the group consisting of cerium oxide, titanium oxide and zirconium oxide.

2. The phase-change optical recording medium according to claim 1, wherein the phase-change optical recording film is represented by the general formula:

$$Ge_xSb_yTe_z,$$

where x+y+z=100, and a composition thereof falls within a range defined by x=55 and z=45; x=45 and z=55; x=20, y=20 and z=60; and x=20, y=28 and z=52 in the GeSbTe ternary phase diagram.

3. The phase-change optical recording medium according to claim 2, wherein the phase-change optical recording film is represented by the general formula:

$$Ge_xSb_yTe_z,$$

where x+y+z=100, and a composition thereof falls within a range defined by x=55 and z=45; x=45 and z=55; x=25, y=16 and z=59; and x=25, y=24 and z=51 in the GeSbTe ternary phase diagram.

4. The phase-change optical recording medium according to claim 2, wherein the phase-change optical recording film is represented by the general formula in which at least one of Bi and Sn is partly substituted for a constituent element of the phase-change optical recording film:

$$(Ge_{(1-w)}Sn_w)_x(Sb_{(1-v)}Bi_v)_yTe_z,$$

where x+y+z=100, 0≦w<0.5, and 0≦v<0.7.

5. A phase-change optical recording medium, comprising:
a transparent substrate;
a first interference film formed on the transparent substrate;
a lower interface film formed on the first interference film;
a phase-change optical recording film that permits reversible phase change between a crystalline phase and an amorphous phase upon irradiation with light formed on the lower interface film;
an upper interface film formed on the phase-change optical recording film; and
a reflection film formed on the upper interface film,
the lower and upper interface films being formed of hafnium oxide, or a mixture of hafnium oxide and at least one oxide selected from the group consisting of cerium oxide, titanium oxide and zirconium oxide.

6. A phase-change optical recording medium, comprising:
a semi-transparent, first information layer comprising a phase-change optical recording film, an interface film comprising at least one oxide selected from the group consisting of hafnium oxide and cerium oxide and formed in contact with at least one surface of the phase-change optical recording film, a semi-transparent reflection film, and a heat sink film;
a second information layer; and
a resin layer formed between the first information layer and the second information layer,
in which heat conductivity of the heat sink film is at least 0.7 times as high as that of the interface film and not higher than 100 W/mK.

7. The phase-change optical recording medium according to claim 6, wherein a difference between a refractive index of the heat sink film and that of the resin layer is 0.5 or less.

8. The phase-change optical recording medium according to claim 6, wherein the interface film is formed of hafnium oxide, and the heat sink film is formed of aluminum oxide.

9. The phase-change optical recording medium according to claim 6, wherein the interface film comprises a lower interface film in contact with a lower surface of the phase-change optical recording film and an upper interface film in contact with an upper surface of the phase-change optical recording film.

10. The phase-change optical recording medium according to claim 9, further comprising a first interference film formed on a transparent substrate; and a second interference film, wherein the lower interface film is formed on the first interference film and the second interference film is formed on the interface film.

11. The phase-change optical recording medium according to claim 6, wherein the interface film comprises an upper interface film in contact with an upper surface of the phase-change optical recording film.

12. The phase-change optical recording medium according to claim 11, further comprising a first interference film formed on a transparent substrate; and a second interference film, wherein the phase-change optical recording film is formed on the first interference film and the second interference film is formed on the upper interface film.

13. The phase-change optical recording medium according to claim 11, further comprising a first interference film formed on a transparent substrate, wherein the phase-change optical recording film is formed on the first interference film and the semi-transparent reflection film is formed on the upper interface film.

14. The phase-change optical recording medium according to claim 6, wherein the second information layer has a structure in which a reflection film, a second interference film, a phase-change optical recording film, and a first interference film are formed on a second transparent substrate.

15. The phase-change optical recording medium according to claim 6, wherein the phase-change optical recording film is represented by the general formula:

$$Ge_xSb_yTe_z,$$

where x+y+z=100, and a composition thereof falls within a range defined by x=55 and z=45; x=45 and z=55; x=20, y=20 and z=60; and x=20, y=28 and z=52 in the GeSbTe ternary phase diagram.

16. The phase-change optical recording medium according to claim 15, wherein the phase-change optical recording film is represented by the general formula:

$$Ge_xSb_yTe_z,$$

where x+y+z=100, and a composition thereof falls within a range defined by x=55 and z=45; x=45 and z=55; x=25, y=16 and z=59; and x=25, y=24 and z=51 in the GeSbTe ternary phase diagram.

17. The phase-change optical recording medium according to claim 15, wherein the phase-change optical recording film is represented by the general formula in which at least one of Bi and Sn is partly substituted for a constituent element of the phase-change optical recording film:

$$(Ge_{(1-w)}Sn_w)_x(Sb_{(1-v)}Bi_v)_yTe_z,$$

where x+y+z=100, 0≦w<0.5, and 0≦v<0.7.

18. The phase-change optical recording medium according to claim 6, wherein the interface film further comprises 50 mol % or less of at least one component selected from the group consisting of AlN, Al₂O₃, SiO₂, SiO, Si—O—N, Si—N, Al—O—N, Si—C, TiO₂, Ta—N, Ta₂O₅, Ta—O—N, Zn—O, ZnS, ZrO₂, Zr—O—N, Zr—N, Cr—O, Mo—O, W—O, V—O, Nb—O, Ta—O, In—O, Cu—O, Sn—O and In—Sn—O.

* * * * *